(12) United States Patent
Chang et al.

(10) Patent No.: US 12,454,674 B2
(45) Date of Patent: Oct. 28, 2025

(54) METHOD OF ENCAPSULATING SINGLE CELLS UTILIZING AN ALTERNATING CURRENT ELECTROSPRAY

(71) Applicant: UNIVERSITY OF NOTRE DAME DU LAC, South Bend, IN (US)

(72) Inventors: Hsueh-Chia Chang, South Bend, IN (US); Zehao Pan, South Bend, IN (US); Vivek Yadav, South Bend, IN (US); Loan Bui, South Bend, IN (US); Donny Hanjaya-Putra, South Bend, IN (US)

(73) Assignee: UNIVERSITY OF NOTRE DAME DU LAC, South Bend, IN (US)

( * ) Notice: Subject to any disclaimer, the term of this patent is extended or adjusted under 35 U.S.C. 154(b) by 402 days.

(21) Appl. No.: 18/039,848

(22) PCT Filed: Dec. 3, 2021

(86) PCT No.: PCT/US2021/061715
§ 371 (c)(1),
(2) Date: Jun. 1, 2023

(87) PCT Pub. No.: WO2022/120114
PCT Pub. Date: Jun. 9, 2022

(65) Prior Publication Data
US 2024/0002781 A1    Jan. 4, 2024

Related U.S. Application Data

(60) Provisional application No. 63/121,369, filed on Dec. 4, 2020.

(51) Int. Cl.
*C12N 5/00* (2006.01)
*C12N 5/077* (2010.01)
(Continued)

(52) U.S. Cl.
CPC ........ *C12N 5/0012* (2013.01); *C12N 5/0652* (2013.01); *C12N 5/0693* (2013.01);
(Continued)

(58) Field of Classification Search
None
See application file for complete search history.

(56) References Cited

U.S. PATENT DOCUMENTS

| 8,267,914 B1 | 9/2012 | Chang et al. |
| 9,040,816 B2 | 5/2015 | Gupta |

(Continued)

FOREIGN PATENT DOCUMENTS

| CN | 107946677 A | 4/2018 |
| CN | 108475765 A | 8/2018 |

(Continued)

OTHER PUBLICATIONS

Chang, Samuel; et al; "Emulsion-based encapsulation of pluripotent stem cells in hydrogel microspheres for cardiac differentiation" Biotechnology Progress, 36, e2986, 2020 (Year: 2020).*

(Continued)

*Primary Examiner* — David W Berke-Schlessel
(74) *Attorney, Agent, or Firm* — Michael Best & Friedrich LLP

(57) ABSTRACT

Described herein is a method for encapsulating single cells using alternating current electrospray technology in tip streaming mode. The encapsulation efficiency is over 80% and natural (alginate, collagen) and synthetic (NorHA) hydrogels and various cell types can be used. The encapsulated cells can be implanted and are protected from the host's immune response. In addition, the coating allows better tissue growth in laboratory cell cultures with a conformal mechanical support that allows molecular and nutrient transport.

20 Claims, 21 Drawing Sheets

(51) Int. Cl.
*C12N 5/09* (2010.01)
*C12N 13/00* (2006.01)
(52) U.S. Cl.
CPC .......... *C12N 13/00* (2013.01); *C12N 2533/30* (2013.01); *C12N 2533/54* (2013.01); *C12N 2533/74* (2013.01); *C12N 2537/10* (2013.01)

(56) References Cited

U.S. PATENT DOCUMENTS

| | | |
|---|---|---|
| 9,555,007 B2 | 1/2017 | Ma et al. |
| 10,172,791 B2 | 1/2019 | Ma et al. |
| 2002/0150669 A1 | 10/2002 | Pui et al. |
| 2005/0244505 A1 | 11/2005 | Higbee et al. |
| 2009/0035381 A1 | 2/2009 | Stankus et al. |
| 2012/0028170 A1 | 2/2012 | Sarlak et al. |
| 2012/0199732 A1 | 8/2012 | Chetwani et al. |
| 2012/0270295 A1 | 10/2012 | Choo et al. |
| 2014/0127290 A1 | 5/2014 | He et al. |
| 2015/0129793 A1 | 5/2015 | Ruan |
| 2015/0157569 A1 | 6/2015 | Shum et al. |
| 2015/0333376 A1 | 11/2015 | Gaben |
| 2015/0342891 A1 | 12/2015 | Shum et al. |
| 2016/0013513 A1 | 1/2016 | Gaben |
| 2016/0030359 A1 | 2/2016 | Ma et al. |
| 2017/0007741 A1 | 1/2017 | D'lima et al. |
| 2017/0095514 A1 | 4/2017 | Ma et al. |
| 2017/0106061 A1 | 4/2017 | Birmingham |
| 2017/0106082 A1 | 4/2017 | Birmingham |
| 2017/0107505 A1 | 4/2017 | Birmingham |
| 2019/0217315 A1 | 7/2019 | Maguire et al. |
| 2019/0283325 A1 | 9/2019 | Attenborough et al. |
| 2019/0352698 A1 | 11/2019 | Chang et al. |
| 2019/0374470 A1 | 12/2019 | Coffman et al. |
| 2020/0303718 A1 | 9/2020 | Gaben |

FOREIGN PATENT DOCUMENTS

| | | |
|---|---|---|
| CN | 111419874 A | 7/2020 |
| EP | 2724775 B1 | 2/2020 |
| IN | 201711004700 A | 8/2018 |
| KR | 101744385 B1 | 6/2017 |
| WO | 2006083260 A2 | 8/2006 |
| WO | 2009145842 A2 | 12/2009 |
| WO | 2011047870 A1 | 4/2011 |
| WO | 2013124867 A1 | 8/2013 |
| WO | 2013124869 A2 | 8/2013 |
| WO | 2014110449 A1 | 7/2014 |
| WO | 2014113413 A1 | 7/2014 |
| WO | 2016138423 A1 | 9/2016 |
| WO | 2016187225 A1 | 11/2016 |
| WO | 2018081616 A1 | 5/2018 |
| WO | 2018187407 A1 | 10/2018 |
| WO | 2019094700 A1 | 5/2019 |
| WO | 2019226969 A1 | 11/2019 |
| WO | 2019078311 A1 | 11/2020 |

OTHER PUBLICATIONS

Zhao, Shuting; et al; "Coaxial electrospray of liquid core-hydrogel shell microcapsules for encapsulation and miniaturized 3D culture of pluripotent stem cells" Integrative Biology, 6, 874-884, 2014 (Year: 2014).*
Choe, Goeun; et al; "Hydrogel Biomaterials for Stem Cell Microencapsulation" Polymers, 10, 997, 2018 (Year: 2018).*
Xu, Yichi; et al; "Optimization of electrospray fabrication of stem cell-embedded alginate-gelatin microspheres and their assembly in 3D-printed poly(&-caprolactone) scaffold for cartilage tissue engineering" Journal of Orthopaedic Translation, 18, 128-141, 2019 (Year: 2019).*
Tomei et al., "Device design and materials optimization of conformal coating for islets of Langerhans," Proc. Natl. Acad. Sci. USA 111(29): 10514-10519 (2014).
Utech et al., "Microfluidic Generation of Monodisperse, Structurally Homogeneous Alginate Microgels for Cell Encapsulation and 3D Cell Culture," Adv. Healthc. Mater. 4(11): 1628-1633 (2015).
Vega, S. L., et al. "Combinatorial hydrogels with biochemical gradients for screening 3D cellular microenvironments." Nature communications 9.1 (2018): 614.
Veiseh et al., "Size- and shape-dependent foreign body immune response to materials implanted in rodents and non-human primates," Nat. Mater. 14(6): 643-651 (2015).
Visser, C. W., et al. "In-air microfluidics enables rapid fabrication of emulsions, suspensions, and 3D modular (bio) materials." Science advances 4.1 (2018): eaao1175.
Ward, E., et al. "Combining bio-electrospraying with gene therapy: a novel biotechnique for the delivery of genetic material via living cells." Analyst 135.5 (2010): 1042-1049.
Wei, Z., et al. "Hydrogel network dynamics regulate vascular morphogenesis." Cell Stem Cell 27.5 (2020): 798-812.
Wilson, J. T., et al. "Cell surface engineering with polyelectrolyte multilayer thin films." Journal of the American Chemical Society 133.18 (2011): 7054-7064.
Wolf, K.J. et al. "Hyaluronic acid: incorporating the bio into the material." ACS biomaterials science & engineering 5.8 (2019): 3753-3765.
Xia et al., "Oxygen-Purged Microfluidic Device to Enhance Cell Viability in Photopolymerized PEG Hydrogel Microparticles," Biomacromolecules 17(7): 2459-2465 (2016).
Xu, T., et al. "High-Throughput Production of Single-Cell Microparticles Using an Inkjet Printing Technology." Journal of manufacturing science and engineering 130.2 (2008).
Yang, Y. et al. "Challenges and opportunities of allogeneic donor-derived CAR T cells." Current opinion in hematology 22.6 (2015): 509.
Zhao, S., et al. "Coaxial electrospray of liquid core-hydrogel shell microcapsules for encapsulation and miniaturized 3D culture of pluripotent stem cells." Integrative Biology 6.9 (2014): 874-884.
Zou et al., "Dynamic Supramolecular Hydrogels Spanning an Unprecedented Range of Host-Guest Affinity," ACS Appl. Mater. Interfaces 11(6): 5695-5700 (2019).
Abeyewickreme, A., et al. "Bio-electrospraying embryonic stem cells: interrogating cellular viability and pluripotency." Integrative Biology 1.3 (2009): 260-266.
Alderfer, L., et al. "Matrix stiffness primes lymphatic tube formation directed by vascular endothelial growth factor-C." FASEB journal: official publication of the Federation of American Societies for Experimental Biology 35.5 (2021): e21498.
Biol et al., "Encapsulation of angiogenic monocytes using bio-spraying technology," Integrative Biol. 4(6): 628-632 (2012).
Burdick, J.A. et al. "Hyaluronic acid hydrogels for biomedical applications." Advanced materials 23.12 (2011): H41-H56.
Chaudhuri, O., et al. "Hydrogels with tunable stress relaxation regulate stem cell fate and activity." Nature materials 15.3 (2016): 326-334.
Chetwani et al., "Universal cone angle of ac electrosprays due to net charge entrainment," Phys. Rev. Lett. 101(20): 204501 (2008).
Darling, N. J., et al. "Click by click microporous annealed particle (MAP) scaffolds." Advanced healthcare materials 9.10 (2020): 1901391.
De Rutte, J.M. et al. "Scalable high-throughput production of modular microgels for in situ assembly of microporous tissue scaffolds." Advanced Functional Materials 29.25 (2019): 1900071.
Dhar, M., et al. "Functional profiling of circulating tumor cells with an integrated vortex capture and single-cell protease activity assay." Proceedings of the National Academy of Sciences 115.40 (2018): 9986-9991.
Gañán-Calvo et al., "Review on the physics of electrospray: From electrokinetics to the operating conditions of single and coaxial Taylor cone-jets, and AC electrospray," J. Aerosol Sci. 125: 32-56 (2018).
Gerecht, S., et al. "Hyaluronic acid hydrogel for controlled self-renewal and differentiation of human embryonic stem cells." Proceedings of the National Academy of Sciences 104.27 (2007): 11298-11303.

(56) References Cited

OTHER PUBLICATIONS

Gordon, J.E. et al. "Dielectrophoretic discrimination of bovine red blood cell starvation age by buffer selection and membrane cross-linking." Biomicrofluidics 1.4 (2007).
Gramlich et al., "Synthesis and orthogonal photopatterning of hyaluronic acid hydrogels with thiol-norbornene chemistry," Biomaterials 34(38): 9803-9811 (2013).
Griffin, D. R., et al. "Activating an adaptive immune response from a hydrogel scaffold imparts regenerative wound healing." Nature materials 20.4 (2021): 560-569.
Guvendiren, M. et al. "Stiffening hydrogels to probe short-and long-term cellular responses to dynamic mechanics." Nature communications 3.1 (2012): 792.
Hanjaya-Putra et al., "Controlled activation of morphogenesis to generate a functional human microvasculature in a synthetic matrix," Blood 118(3): 804-815 (2011).
Hanjaya-Putra et al., "Spatial control of cell-mediated degradation to regulate vasculogenesis and angiogenesis in hyaluronan hydrogels," Biomaterials 33(26): 6123-6131 (2012).
Hanjaya-Putra, D., et al. "Vascular endothelial growth factor and substrate mechanics regulate in vitro tubulogenesis of endothelial progenitor cells." Journal of cellular and molecular medicine 14.10 (2010): 2436-2447.
Headen, D.M. et al. "Parallel droplet microfluidics for high throughput cell encapsulation and synthetic microgel generation." Microsystems & Nanoengineering 4.1 (2018): 1-9.
Highley, C. B., et al. "Jammed microgel inks for 3D printing applications." Advanced Science 6.1 (2019): 1801076.
Huebsch, N., et al. "Matrix elasticity of void-forming hydrogels controls transplanted-stem-cell-mediated bone formation." Nature materials 14.12 (2015): 1269-1277.
Hui, E., et al. "Spatiotemporal control of viscoelasticity in phototunable hyaluronic acid hydrogels." Biomacromolecules 20.11 (2019): 4126-4134.
Ingram, "Disintegration of water drops in an electric field," Proc. R. Soc. Lond. A 280 (1382): 383-397 (1964).
International Preliminary Report on Patentability for Application No. PCT/US2021/061715 dated May 30, 2023 (4 pages).
International Search Report and Written Opinion for Application No. PCT/US2021/061715 dated Feb. 23, 2022 (5 pages).
Jayasinghe, S.N. et al. "Electrospraying living cells." Small 2.2 (2006): 216-219.
Kabat et al., "Trends in mesenchymal stem cell clinical trials 2004-2018: Is efficacy optimal in a narrow dose range?" Stem Cells Transl. Med. 9(1): 17-27 (2020).
Kamalakshakurup, G., et al. "High-efficiency single cell encapsulation and size selective capture of cells in picoliter droplets based on hydrodynamic micro-vortices." Lab on a Chip 17.24 (2017): 4324-4333.
Kamperman et al., "Single-Cell Microgels : Technology, Challenges, and Applications," Trends Biotechnol. 36 (8):850-865 (2018).
Kamperman, T., et al. "Centering Single Cells in Microgels via Delayed Crosslinking Supports Long-Term 3D Culture by Preventing Cell Escape." small 13.22 (2017): 1603711.
Khetan, S et al. "Sequential crosslinking to control cellular spreading in 3-dimensional hydrogels." Soft Matter 5.8 (2009): 1601-1606.
Khetan, S., et al. "Degradation-mediated cellular traction directs stem cell fate in covalently crosslinked three-dimensional hydrogels." Nature materials 12.5 (2013): 458-465.
Kusuma, S., et al. "Self-organized vascular networks from human pluripotent stem cells in a synthetic matrix." Proceedings of the National Academy of Sciences 110.31 (2013): 12601-12606.
Lee, A. et al. "3D bioprinting of collagen to rebuild components of the human heart." Science 365.6452 (2019): 482-487.
Lienemann et al., "Single cell- laden protease-sensitive microniches for long-term culture in 3D," Lab Chip. 17(4): 727-737 (2017).
Maheshwari, S. et al. "Anomalous conical menisci under an ac field-departure from the dc Taylor cone." Applied physics letters 89.23 (2006).
Maheshwari, S. et al. "Effects of bulk charge and momentum relaxation time scales on ac electrospraying." Journal of applied physics 102.3 (2007).
Mao et al., "Deterministic encapsulation of single cells in thin tunable microgels for niche modelling and therapeutic delivery," Nat. Mater. 16(2): 236-243 (2017).
Mao, A. S., et al. "Programmable microencapsulation for enhanced mesenchymal stem cell persistence and immunomodulation." Proceedings of the National Academy of Sciences 116.31 (2019): 15392-15397.
Matuła, K., et al. "Single-Cell Analysis Using Droplet Microfluidics" Adv. Biosyst (2020): 1900188.
Muir, V. G., et al. "Influence of microgel fabrication technique on granular hydrogel properties." ACS Biomaterials Science & Engineering 7.9 (2021): 4269-4281.
Oh, B., et al. "Single-cell encapsulation via click-chemistry alters production of paracrine factors from neural progenitor cells." Advanced Science 7.8 (2020): 1902573.
Pan et al., "Immersed AC electrospray (iACE) for monodispersed aqueous droplet generation," Biomicrofluidics 12(4): 44113 (2018).
Pan, Z. et al. "Far-field sensitivity of droplet generation: Exponential scaling and cutoff." Physical Review Fluids 4.10 (2019): 101701.
Pan, Z., et al. "Conformal single cell hydrogel coating with electrically induced tip streaming of an AC cone." Biomaterials science 9.9 (May 4, 2021): 3284-3292.
Qazi, T.H. et al. "Granular hydrogels for endogenous tissue repair." Biomaterials and Biosystems 1 (2021): 100008.
Schoeman, R. M., et al. "High-throughput deterministic single-cell encapsulation and droplet pairing, fusion, and shrinkage in a single microfluidic device." Electrophoresis 35.2-3 (2014): 385-392.
Shwartz, M. Target, delete, repair. CRISPR is a revolutionary gene-editing tool, but it's not without risk. Stanford Medicine Magazine. Feb. 26, 2018. Available online at https://stanmed.stanford.edu/crispr-for-gene-editing-is-revolutionary-but-it-comes-with-risks/#:~:text=Older%20gene%2Dediting%20tools%20use,that%20costs%20%2465%20plus%20shipping . . . .
Skylar-Scott, M. A., et al. "Biomanufacturing of organ-specific tissues with high cellular density and embedded vascular channels." Science advances 5.9 (2019): eaaw2459.
Terekhov, S. S., et al. "Microfluidic droplet platform for ultrahigh-throughput single-cell screening of biodiversity." Proceedings of the National Academy of Sciences 114.10 (2017): 2550-2555.

\* cited by examiner

AC 300kHz: rest

AC 300kHz: ejection

AC 1kHz: rest

AC 1kHz: aggregation

Alizarin Red S

NorHA

HA-Nor-BM

METHOD OF ENCAPSULATING SINGLE CELLS UTILIZING AN ALTERNATING CURRENT ELECTROSPRAY

CROSS-REFERENCE TO RELATED APPLICATIONS

This application is a U.S. national stage entry of International Patent Application No. PCT/US2021/061715, filed on Dec. 3, 2021, which claims priority to U.S. Provisional Patent Application No. 63/121,369, filed on Dec. 4, 2020, the entire contents of each of which are fully incorporated herein by reference.

FEDERALLY SPONSORED RESEARCH

This invention was made with government support under grant number R21 HG009010 awarded by the National Institutes of Health. The government has certain rights in the invention.

TECHNICAL FIELD

Described herein is a method for encapsulating single cells using alternating current electrospray technology in tip streaming mode. The encapsulation efficiency is over 80% and natural (alginate, collagen) and synthetic (NorHA) hydrogels and various cell types can be used. The encapsulated cells can be implanted and are protected from the host's immune response. In addition, the coating allows better tissue growth in laboratory cell cultures with a conformal mechanical support that allows molecular and nutrient transport.

BACKGROUND

Single cell encapsulation in a micrometer-thick microgel is a new protective bioengineering strategy to increase the surface-to-volume ratio in cell encapsulation for cell therapy, 3D cell culture pharmacokinetic studies, and tissue engineering [1]. Unlike the conventional approach where multiple cells are encapsulated in millimeter sized gel particles, the thin microgel approach improves molecular transport and manipulability, which results in high survival and cell retention in vivo. Although cell injection-based therapies have shown initial success in Phase I clinical trials in over 900+ studies, they have shown only modest improvement overall [2]. It was observed that encapsulated cells injected immediately into the calf muscle are vulnerable to host clearance through immune cells or apoptosis triggered via the hypoxic, pro-inflammatory environment [3]. One important reason for these disappointing results is the poor cell retention and low potency following the injection of the encapsulated cells. In comparison, thin microgels or conformal coatings not only allow rapid diffusion of oxygen, nutrients, and cellular waste, but also block immunoglobulins to mitigate the innate immune response. Moreover, the length scale of single cell laden microgels also helps to avoid several unwanted outcomes including cell hypoxia, fibrotic capsule formation, or infarction after transplantation [4-5].

To achieve single cell encapsulation in a thin microgel, droplet microfluidics, vibrating jets, and inkjet technologies have to compromise between high throughput and the microgel size. Despite the recent progress in droplet microfluidics for generating uniform micrometer-sized hydrogel droplets, regular PDMS based microfluidic channels often cannot bear the high pumping pressure required to produce droplets similar to the size of the cell using the viscous hydrogel solution. This problem was recently solved by Mao et al. by pre-coating the cells with crosslinking agents (e.g., calcium carbonate nanoparticles) for alginate hydrogel [5]. The controlled supply of crosslinking agents allows the sol-gel transition to happen within only a few micrometers around the cell, thus automatically eliminating the excess hydrogel around the cell and empty gel particles during extraction into the aqueous phase [5]. The method has also been expanded to PEG hydrogel using a special crosslinking chemistry [6]. However, the adsorption rate of nanoparticles is influenced by the "stickiness" of the cell membrane, making the method subject to variation among different cell types. The requirement of an insoluble crosslinking agent also limits the type of gel that can be used for cell encapsulation. Another approach is to use the hydrodynamic method to create a jet thinner than the cell diameter so that Rayleigh instability will be induced around the cell forming a droplet containing a single cell with a thin gel layer. Because high shear rate from the sheath flow is needed to form a hydrodynamic jet, this method requires precise tuning of the flow-focusing droplet generation system for different cell size and concentration and for different fluid rheologies [7]. Nonetheless, tuning of both the continuous and dispersed phase flow rates of the flow-focusing design is difficult and hence single-cell occupancy is difficult to achieve.

Therefore, there is a need for a new technology that can produce robust conformal coating of a single cell with high reproducibility and universality. Ideally, this generic technology does not require the assistance of a high-shear flow and does not depend on the cell and hydrogel-specific adsorbing crosslinking agents. Moreover, the technology should avoid any further downstream sorting of empty droplets in complicated chips or flow cytometry sorters.

SUMMARY

One embodiment described herein is a method for high-throughput single-cell encapsulation and tip streaming, the method comprising: combining a plurality of cells with a hydrogel and oil to generate a water-in-oil emulsion; agitating the emulsion to drive single cells into the center of individual hydrogel beads to generate single-cell encapsulated hydrogel beads; crosslinking the hydrogel; extracting the crosslinked single-cell encapsulated hydrogel beads from the emulsion into cell media; transferring the extracted single-cell encapsulated hydrogel beads into a micropipette; applying a back pressure and alternating current (AC) electric potential to the micropipette to generate an AC Taylor cone encompassing a droplet containing the single-cell encapsulated hydrogel bead at the micropipette tip; and ejecting the droplet containing the single-cell encapsulated hydrogel bead from the micropipette tip. In one aspect, the plurality of cells comprises human cells. In another aspect, the plurality of cells comprises human cancer cells. In another aspect, the plurality of cells comprises human multipotent mesenchymal stromal cells (hMSCs). In another aspect, agitating comprises the use of a shaker at about 500-5000 rpm for at least about 1 minutes. In another aspect, agitating does not affect droplet monodispersity. In another aspect, the hydrogel comprises a natural hydrogel or a synthetic hydrogel. In another aspect, the natural hydrogel comprises alginate or collagen. In another aspect, the alginate is present at about 2 wt %. In another aspect, the alginate encapsulated hydrogel beads have an average thickness of about 4-5 μm. In another aspect, the collagen encapsulated hydrogel beads have an average thickness of about 4-6 μm. In another aspect, the alginate encapsulated hydrogel beads have a cell viability of about 80-90% immediately after encapsulation. In another aspect, the collagen encapsulated hydrogel beads have a cell viability of about 90-95% immediately after encapsulation. In another aspect, the alginate encapsulated hydrogel beads have a cell viability of about 80-85% after 24 hours in vitro. In another aspect, the collagen encapsulated hydrogel beads have a cell viability of about 70-75% after 24 hours in vitro. In another aspect, the crosslinking of alginate comprises mixing alginate with a complex of divalent cations ($Ca^{2+}$ or $Mg^{2+}$), ethylenediaminetetraacetic acid (EDTA), and 0.01% acetic acid for about 2 minutes. In another aspect, the crosslinking of collagen comprises increasing the temperature of the collagen to 37° C. at a neutral pH for about 30 minutes. In another aspect, extracting the single-cell encapsulated alginate beads into cell media comprises mixing the emulsion with 10% w/w 1H,1H,2H,2H-perfluorooctanol (PFO) followed by centrifugation at about 100-500×g for at least about 2 minutes. In another aspect, extracting the single-cell encapsulated collagen beads into cell media comprises mixing the emulsion with 10% w/w 1H,1H,2H,2H-perfluorooctanol (PFO) followed by centrifugation at about 100-500×g for at least about 2 minutes. In another aspect, the synthetic hydrogel comprises hyaluronic acid functionalized with norbornene groups (NorHA). In another aspect, the NorHA hydrogel is prepared by mixing 1.2% w/v NorHA macromer with dithiothreitol (DTT) at a 0.8 ratio in PBS and adding 0.2% w/v of the water soluble photoinitiator lithium phenyl-2,4,6-trimethylbenzoylphosphinate (LAP). In another aspect, the NorHA encapsulated hydrogel beads have an average thickness of about 2-3 μm. In another aspect, the NorHA encapsulated hydrogel beads have a cell viability of about 80-90% immediately after encapsulation. In another aspect, the NorHA encapsulated hydrogel beads have a cell viability of greater than 80% after 24 hours in vitro. In another aspect, the crosslinking of NorHA comprises irradiating the NorHA with UV light (10 mW $cm^{-2}$, 365 nm) for at least about 5 seconds. In another aspect, extracting the single-cell encapsulated NorHA beads into cell media comprises mixing the emulsion with 25% w/w 1H,1H,2H,2H-perfluorodecanol (PFD) followed by centrifugation at about 100-500×g for at least about 2 minutes. In another aspect, the NorHA has a Young's modulus of about 2.86±0.02 kPa. In another aspect, the NorHA hydrogel preserves the osteogenic and adipogenic differentiation potential of hMSCs. In another aspect, the droplet encompassed by the AC Taylor cone and containing the single-cell encapsulated hydrogel bead is electroneutral. In another aspect, the micropipette tip has a diameter of about 30 μm. In another aspect, the AC electric potential comprises a frequency greater than the inverse charge relaxation time of the micropipette tip orifice. In another aspect, the AC electric potential comprises a frequency of about 10 kHz to about 300 KHz. In another aspect, the AC electric potential comprises a voltage of about 300 V to about 500 V. In another aspect, the AC electric potential comprises a voltage of about 420 V at a frequency of about 300 KHz. In another aspect, the AC Taylor cone has a half angle less than 49°. In another aspect, the AC Taylor cone has a half angle of 11°. In another aspect, the back pressure is set slightly below a critical pressure of 2.4 kPa. In another aspect, the back pressure is set at about 1.6 to about 2.2 kPa. In another aspect, the droplet has a diameter size range of about 1 μm to about 10 μm. In another aspect, the tip streaming has a flow rate of about 5 nL/min. In another aspect, the method generates an encapsulation efficiency greater than 80%. In another aspect, greater than 85% of the single-cell encapsulated hydrogel beads have a concentric index (CI) below 0.8, indicating that most encapsulated single cells are centered within the hydrogel bead droplet. In another aspect, the single-cell encapsulated hydrogel beads are used as bio-ink for three-dimensional printing applications. In another aspect, the method eliminates the need for any further downstream sorting of empty droplets in complicated chips or flow cytometry sorters.

DESCRIPTION OF THE DRAWINGS

FIG. 5A shows a representative image of hMSCs encapsulated in NorHA microgel with the fluorescence image superimposed with the bright field image. Blue: cell nucleus, Green: Calcein stain. Scale bar: 20 µm. FIG. 5B shows gel layer thickness (red triangle) and concentric index (blue square) of 30 randomly chosen single hMSC encapsulated NorHA gel particles. FIG. 5C shows the viability of encapsulated cells 1 day, 2 days, and 3 days after encapsulation. Data represent mean±S.D. of five experimental runs. FIG. 5D shows microscopic images of osteogenic differentiation of hMSCs (both adherent and NorHA-encapsulated cells). Differentiated cells, cultured in MSC Osteogenic Differentiation Medium for 7 days, show calcium deposits (bright orange-red, top) as stained with Alizarin Red S solution. Scale bars: 100 µm. FIG. 5E shows a quantification graph comparing the percentage of positive differentiated encapsulated cells versus adherent cells. P-value=0.517. FIG. 5F shows microscopic images of adipogenic differentiation of hMSCs (both adherent and NorHA-encapsulated cells). Differentiated cells, cultured in MSC Adipogenic Differentiation Medium for 7 days, show lipid deposits (red, top) as stained with Oil Red O solution. Scale bars: 100 µm. FIG. 5G shows a quantification graph comparing the percentage of positive differentiated encapsulated cells versus adherent cells. P-value=0.153. Data represent mean±S.D. of five experimental runs with ≥30 microgels of cells analysed per condition in each replicate run.

DETAILED DESCRIPTION

Figure 1A:
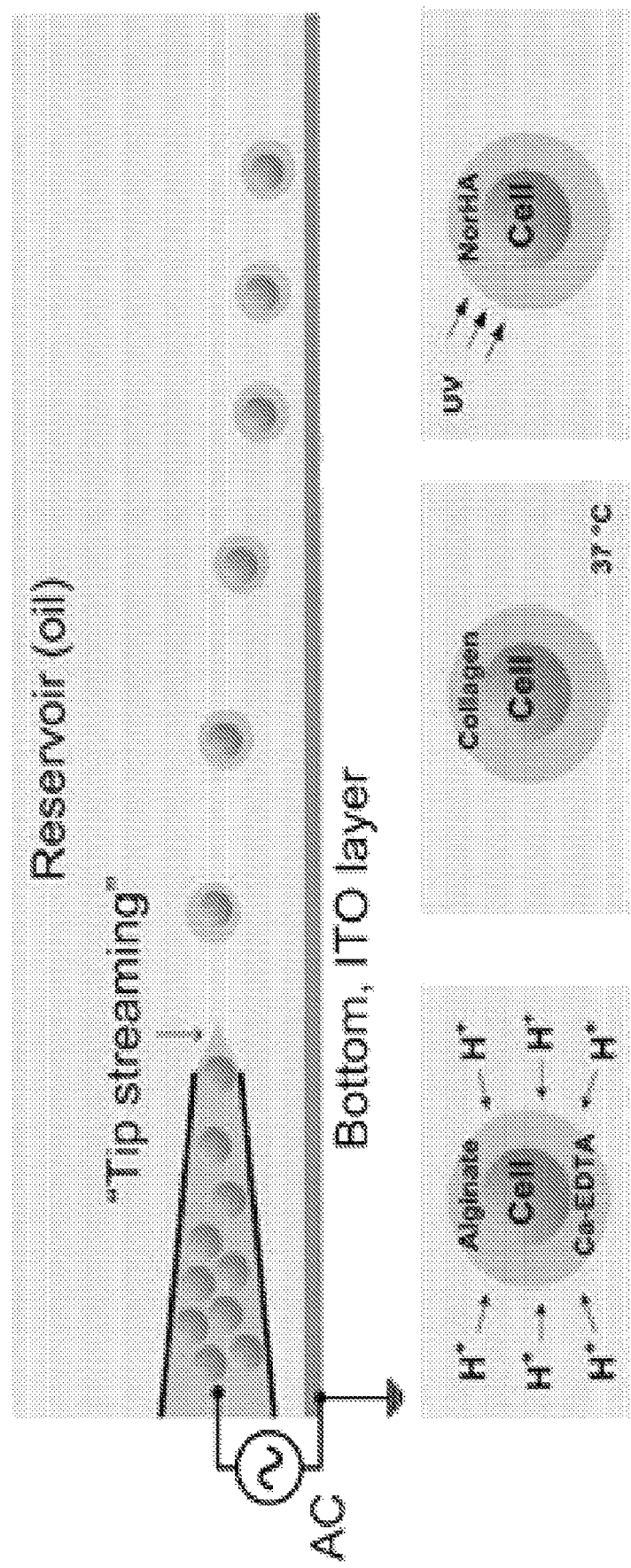
FIG. 1A shows a schematic for single-cell gel coating using the tip-streaming mode. For encapsulation with alginate gel, the alginate solution is cross-linked by releasing the premixed Ca-EDTA complex using acetic acid. For encapsulation with collagen gel, the droplets were incubated at 37° C. for 30 minutes to induce gelation. Encapsulation of the NorHA hydrogel was performed by photo-crosslinking of the NorHA precursor solution with UV exposure (10 mW $cm^{-2}$, 365 nm).

Unless otherwise defined, all technical and scientific terms used herein have the same meaning as commonly understood by one of ordinary skill in the art. For example, any nomenclatures used in connection with, and techniques of, cell and tissue culture, molecular biology, immunology, microbiology, genetics, and protein and nucleic acid chemistry and hybridization described herein are well known and commonly used in the art. In case of conflict, the present disclosure, including definitions, will control. Exemplary methods and materials are described below, although methods and materials similar or equivalent to those described herein can be used in practice or testing of the embodiments and aspects described herein.

As used herein, the terms "amino acid," "nucleotide," "polynucleotide," "vector," "polypeptide," and "protein" have their common meanings as would be understood by a biochemist of ordinary skill in the art. Standard single letter nucleotides (A, C, G, T, U) and standard single letter amino acids (A, C, D, E, F, G, H, I, K, L, M, N, P, Q, R, S, T, V. W, or Y) are used herein.

As used herein, the terms such as "include," "including," "contain," "containing," "having," and the like mean "comprising." The present disclosure also contemplates other embodiments "comprising," "consisting of," and "consisting essentially of," the embodiments or elements presented herein, whether explicitly set forth or not.

As used herein, the term "a," "an," "the" and similar terms used in the context of the disclosure (especially in the context of the claims) are to be construed to cover both the singular and plural unless otherwise indicated herein or clearly contradicted by the context. In addition, "a," "an," or "the" means "one or more" unless otherwise specified.

As used herein, the term "or" can be conjunctive or disjunctive.

As used herein, the term "substantially" means to a great or significant extent, but not completely.

As used herein, the term "about" or "approximately" as applied to one or more values of interest, refers to a value that is similar to a stated reference value, or within an acceptable error range for the particular value as determined by one of ordinary skill in the art, which will depend in part on how the value is measured or determined, such as the limitations of the measurement system. In one aspect, the term "about" refers to any values, including both integers and fractional components that are within a variation of up to ±10% of the value modified by the term "about." Alternatively, "about" can mean within 3 or more standard deviations, per the practice in the art. Alternatively, such as with respect to biological systems or processes, the term "about" can mean within an order of magnitude, in some embodiments within 5-fold, and in some embodiments within 2-fold, of a value. As used herein, the symbol "~" means "about" or "approximately."

All ranges disclosed herein include both end points as discrete values as well as all integers and fractions specified within the range. For example, a range of 0.1-2.0 includes 0.1, 0.2, 0.3, 0.4 . . . 2.0. If the end points are modified by the term "about," the range specified is expanded by a variation of up to ±10% of any value within the range or within 3 or more standard deviations, including the end points.

As used herein, the terms "control," or "reference" are used herein interchangeably. A "reference" or "control" level may be a predetermined value or range, which is employed as a baseline or benchmark against which to assess a measured result. "Control" also refers to control experiments or control cells.

As used herein, the terms "inhibit," "inhibition," or "inhibiting" refer to the reduction or suppression of a given biological process, condition, symptom, disorder, or disease, or a significant decrease in the baseline activity of a biological activity or process.

Described herein is a method for single cell encapsulation using an immersed AC electrospray that can not only produce predominantly single cell thin-layered hydrogel beads, but also circumvents the use of cell- and hydrogel-specific adsorbing crosslinking agents. The results demonstrate the universality of the method by using both natural (alginate and collagen) and synthetic (hyaluronic acid functionalized with norbornene groups, NorHA) hydrogels as encapsulation material. Alginate can be crosslinked using divalent cations (i.e., $Ca^{2+}$ or $Mg^{2+}$), while collagen at neutral pH can be crosslinked simply by raising the temperature to 37° C. Synthetic NorHA hydrogels, on the other hand, can be crosslinked using light-mediated thiol-norbornene chemistry.

Encapsulation of single cells in a thin hydrogel provides a more precise control of stem cell niches and better molecular transport. Despite the recent advances in microfluidic technologies to allow encapsulation of single cells, existing methods rely on special crosslinking agents that are pre-coated on the cell surface and subject to the variation of the cell membrane, which limits their widespread adoption. Described herein is a high-throughput single-cell encapsulation method based on the "tip streaming" mode of alternating current (AC) electrospray, with encapsulation efficiencies over 80% after tuned centrifugation. Dripping with multiple cells is avoided due to gating by the sharp conic meniscus of the tip streaming mode that only allows one cell to be ejected at a time. Moreover, the method can be universally applied to both natural and synthetic hydrogels, as well as various cell types, including human multipotent mesenchymal stromal cells (hMSCs). Encapsulated hMSCs are able to maintain good cell viability over an extended culture period and exhibit robust differentiation potential into osteoblasts and adipocytes. Collectively, electrically induced tip streaming enables high-throughput encapsulation of single cells with high efficiency and universality, which is applicable for various applications in cell therapy, pharmacokinetic studies, and regenerative medicine.

One embodiment described herein is a method for high-throughput single-cell encapsulation and tip streaming, the method comprising: combining a plurality of cells with a hydrogel and oil to generate a water-in-oil emulsion; agitating the emulsion to drive single cells into the center of individual hydrogel beads to generate single-cell encapsulated hydrogel beads; crosslinking the hydrogel; extracting the crosslinked single-cell encapsulated hydrogel beads from the emulsion into cell media; transferring the extracted single-cell encapsulated hydrogel beads into a micropipette; applying a back pressure and alternating current (AC) electric potential to the micropipette to generate an AC Taylor cone encompassing a droplet containing the single-cell encapsulated hydrogel bead at the micropipette tip; and ejecting the droplet containing the single-cell encapsulated hydrogel bead from the micropipette tip. In one aspect, the plurality of cells comprises human cells. In another aspect, the plurality of cells comprises human cancer cells. In another aspect, the plurality of cells comprises human multipotent mesenchymal stromal cells (hMSCs). In another aspect, agitating comprises the use of a shaker at about 500-5000 rpm for at least about 1 minutes. In another aspect, agitating does not affect droplet monodispersity. In another aspect, the hydrogel comprises a natural hydrogel or a synthetic hydrogel. In another aspect, the natural hydrogel comprises alginate or collagen. In another aspect, the alginate is present at about 2 wt %. In another aspect, the alginate encapsulated hydrogel beads have an average thickness of about 4-5 µm. In another aspect, the collagen encapsulated hydrogel beads have an average thickness of about 4-6 µm. In another aspect, the alginate encapsulated hydrogel beads have a cell viability of about 80-90% immediately after encapsulation. In another aspect, the collagen encapsulated hydrogel beads have a cell viability of about 90-95% immediately after encapsulation. In another aspect, the alginate encapsulated hydrogel beads have a cell viability of about 80-85% after 24 hours in vitro. In another aspect, the collagen encapsulated hydrogel beads have a cell viability of about 70-75% after 24 hours in vitro. In another aspect, the crosslinking of alginate comprises mixing alginate with a complex of divalent cations ($Ca^{2+}$ or $Mg^{2+}$), ethylenediaminetetraacetic acid (EDTA), and 0.01% acetic acid for about 2 minutes. In another aspect, the crosslinking of collagen comprises increasing the temperature of the collagen to 37° C. at a neutral pH for about 30 minutes. In another aspect, extracting the single-cell encapsulated alginate beads into cell media comprises mixing the emulsion with 10% w/w 1H,1H,2H,2H-perfluorooctanol (PFO) followed by centrifugation at about 100-500×g for at least about 2 minutes. In another aspect, extracting the single-cell encapsulated collagen beads into cell media comprises mixing the emulsion with 10% w/w 1H,1H,2H,2H-perfluorooctanol (PFO) followed by centrifugation at about 100-500×g for at least about 2 minutes. In another aspect, the synthetic hydrogel comprises hyaluronic acid functionalized with norbornene groups (NorHA). In another aspect, the NorHA hydrogel is prepared by mixing 1.2% w/v NorHA macromer with dithiothreitol (DTT) at a 0.8 ratio in PBS and adding 0.2% w/v of the water soluble photoinitiator lithium phenyl-2,4,6-trimethylbenzoylphosphinate (LAP). In another aspect, the NorHA encapsulated hydrogel beads have an average thickness of about 2-3 µm. In another aspect, the NorHA encapsulated hydrogel beads have a cell viability of about 80-90% immediately after encapsulation. In another aspect, the NorHA encapsulated hydrogel beads have a cell viability of greater than 80% after 24 hours in vitro. In another aspect, the crosslinking of NorHA comprises irradiating the NorHA with UV light (10 mW $cm^{-2}$, 365 nm) for at least about 5 seconds. In another aspect, extracting the single-cell encapsulated NorHA beads into cell media comprises mixing the emulsion with 25% w/w 1H,1H,2H,2H-perfluorodecanol (PFD) followed by centrifugation at about 100-500×g for at least about 2 minutes. In another aspect, the NorHA has a Young's modulus of about 2.86±0.02 kPa. In another aspect, the NorHA hydrogel preserves the osteogenic and adipogenic differentiation potential of hMSCs. In another aspect, the droplet encompassed by the AC Taylor cone and containing the single-cell encapsulated hydrogel bead is electroneutral. In another aspect, the micropipette tip has a diameter of about 30 µm. In another aspect, the AC electric potential comprises a frequency greater than the inverse charge relaxation time of the micropipette tip orifice. In another aspect, the AC electric potential comprises a frequency of about 10 KHz to about 300 KHz. In another aspect, the AC electric potential comprises a voltage of about 300 V to about 500 V. In another aspect, the AC electric potential comprises a voltage of about 420 V at a frequency of about 300 KHz. In another aspect, the AC Taylor cone has a half angle less than 49°. In another aspect, the AC Taylor cone has a half angle of 11°. In another aspect, the back pressure is set slightly below a critical pressure of 2.4 kPa. In another aspect, the back pressure is set at about 1.6 to about 2.2 kPa. In another aspect, the droplet has a diameter size range of about 1 µm to about 10 µm. In another aspect, the tip streaming has a flow rate of about 5 nL/min. In another aspect, the method generates an encapsulation efficiency greater than 80%. In another aspect, greater than 85% of the single-cell encapsulated hydrogel beads have a concentric index (CI) below 0.8, indicating that most encapsulated single cells are centered within the hydrogel bead droplet. In another aspect, the single-cell encapsulated hydrogel beads are used as bio-ink for three-dimensional printing applications. In another aspect, the method eliminates the need for any further downstream sorting of empty droplets in complicated chips or flow cytometry sorters.

It will be apparent to one of ordinary skill in the relevant art that suitable modifications and adaptations to the compositions, formulations, methods, processes, and applications described herein can be made without departing from the scope of any embodiments or aspects thereof. The compositions and methods provided are exemplary and are not intended to limit the scope of any of the specified embodiments. All of the various embodiments, aspects, and options disclosed herein can be combined in any variations or iterations. The scope of the compositions, formulations, methods, and processes described herein include all actual or potential combinations of embodiments, aspects, options, examples, and preferences herein described. The exemplary compositions and formulations described herein may omit any component, substitute any component disclosed herein, or include any component disclosed elsewhere herein. The ratios of the mass of any component of any of the compositions or formulations disclosed herein to the mass of any other component in the formulation or to the total mass of the other components in the formulation are hereby disclosed as if they were expressly disclosed. Should the meaning of any terms in any of the patents or publications incorporated by reference conflict with the meaning of the terms used in this disclosure, the meanings of the terms or phrases in this disclosure are controlling. Furthermore, the foregoing discussion discloses and describes merely exemplary embodiments. All patents and publications cited herein are incorporated by reference herein for the specific teachings thereof.

Various embodiments and aspects of the inventions described herein are summarized by the following clauses:

Clause 1. A method for high-throughput single-cell encapsulation and tip streaming, the method comprising:
(a) combining a plurality of cells with a hydrogel and oil to generate a water-in-oil emulsion;
(b) agitating the emulsion to drive single cells into the center of individual hydrogel beads to generate single-cell encapsulated hydrogel beads;
(c) crosslinking the hydrogel;
(d) extracting the crosslinked single-cell encapsulated hydrogel beads from the emulsion into cell media;
(e) transferring the extracted single-cell encapsulated hydrogel beads into a micropipette;
(f) applying a back pressure and alternating current (AC) electric potential to the micropipette to generate an AC Taylor cone encompassing a droplet containing the single-cell encapsulated hydrogel bead at the micropipette tip; and
(g) ejecting the droplet containing the single-cell encapsulated hydrogel bead from the micropipette tip.

Clause 2. The method of clause 1, wherein the plurality of cells comprises human cells.

Clause 3. The method of clause 1 or 2, wherein the plurality of cells comprises human cancer cells.

Clause 4. The method of any one of clauses 1-3, wherein the plurality of cells comprises human multipotent mesenchymal stromal cells (hMSCs).

Clause 5. The method of any one of clauses 1-4, wherein agitating comprises the use of a shaker at about 500-5000 rpm for at least about 1 minutes.

Clause 6. The method of any one of clauses 1-5, wherein agitating does not affect droplet monodispersity.

Clause 7. The method of any one of clauses 1-6, wherein the hydrogel comprises a natural hydrogel or a synthetic hydrogel.

Clause 8. The method of any one of clauses 1-7, wherein the natural hydrogel comprises alginate or collagen.

Clause 9. The method of any one of clauses 1-8, wherein the alginate is present at about 2 wt %.

Clause 10. The method of any one of clauses 1-9, wherein the alginate encapsulated hydrogel beads have an average thickness of about 4-5 µm.

Clause 11. The method of any one of clauses 1-10, wherein the collagen encapsulated hydrogel beads have an average thickness of about 4-6 µm.

Clause 12. The method of any one of clauses 1-11, wherein the alginate encapsulated hydrogel beads have a cell viability of about 80-90% immediately after encapsulation.

Clause 13. The method of any one of clauses 1-12, wherein the collagen encapsulated hydrogel beads have a cell viability of about 90-95% immediately after encapsulation.

Clause 14. The method of any one of clauses 1-13, wherein the alginate encapsulated hydrogel beads have a cell viability of about 80-85% after 24 hours in vitro.

Clause 15. The method of any one of clauses 1-14, wherein the collagen encapsulated hydrogel beads have a cell viability of about 70-75% after 24 hours in vitro.

Clause 16. The method of any one of clauses 1-15, wherein the crosslinking of alginate comprises mixing alginate with a complex of divalent cations ($Ca^{2+}$ or $Mg^{2+}$), ethylenediaminetetraacetic acid (EDTA), and 0.01% acetic acid for about 2 minutes.

Clause 17. The method of any one of clauses 1-16, wherein the crosslinking of collagen comprises increasing the temperature of the collagen to 37° C. at a neutral pH for about 30 minutes.

Clause 18. The method of any one of clauses 1-17, wherein extracting the single-cell encapsulated alginate beads into cell media comprises mixing the emulsion with 10% w/w 1H,1H,2H,2H-perfluorooctanol (PFO) followed by centrifugation at about 100-500×g for at least about 2 minutes.

Clause 19. The method of any one of clauses 1-18, wherein extracting the single-cell encapsulated collagen beads into cell media comprises mixing the emulsion with 10% w/w 1H,1H,2H,2H-perfluorooctanol (PFO) followed by centrifugation at about 100-500×g for at least about 2 minutes.

Clause 20. The method of any one of clauses 1-19, wherein the synthetic hydrogel comprises hyaluronic acid functionalized with norbornene groups (NorHA).

Clause 21. The method of any one of clauses 1-20, wherein the NorHA hydrogel is prepared by mixing 1.2% w/v NorHA macromer with dithiothreitol (DTT) at a 0.8 ratio in PBS and adding 0.2% w/v of the water soluble photoinitiator lithium phenyl-2,4,6-trimethyl-benzoylphosphinate (LAP).

Clause 22. The method of any one of clauses 1-21, wherein the NorHA encapsulated hydrogel beads have an average thickness of about 2-3 µm.

Clause 23. The method of any one of clauses 1-22, wherein the NorHA encapsulated hydrogel beads have a cell viability of about 80-90% immediately after encapsulation.

Clause 24. The method of any one of clauses 1-23, wherein the NorHA encapsulated hydrogel beads have a cell viability of greater than 80% after 24 hours in vitro.

Clause 25. The method of any one of clauses 1-24, wherein the crosslinking of NorHA comprises irradiating the NorHA with UV light (10 mW cm$^{-2}$, 365 nm) for at least about 5 seconds.

Clause 26. The method of any one of clauses 1-25, wherein extracting the single-cell encapsulated NorHA beads into cell media comprises mixing the emulsion with 25% w/w 1H, 1H,2H,2H-perfluorodecanol (PFD) followed by centrifugation at about 100-500×g for at least about 2 minutes.

Clause 27. The method of any one of clauses 1-26, wherein the NorHA has a Young's modulus of about 2.86±0.02 kPa.

Clause 28. The method of any one of clauses 1-27, wherein the NorHA hydrogel preserves the osteogenic and adipogenic differentiation potential of hMSCs.

Clause 29. The method of any one of clauses 1-28, wherein the droplet encompassed by the AC Taylor cone and containing the single-cell encapsulated hydrogel bead is electroneutral.

Clause 30. The method of any one of clauses 1-29, wherein the micropipette tip has a diameter of about 30 µm.

Clause 31. The method of any one of clauses 1-30, wherein the AC electric potential comprises a frequency greater than the inverse charge relaxation time of the micropipette tip orifice.

Clause 32. The method of any one of clauses 1-31, wherein the AC electric potential comprises a frequency of about 10 kHz to about 300 KHz.

Clause 33. The method of any one of clauses 1-32, wherein the AC electric potential comprises a voltage of about 300 V to about 500 V.

Clause 34. The method of any one of clauses 1-33, wherein the AC electric potential comprises a voltage of about 420 V at a frequency of about 300 KHz.

Clause 35. The method of any one of clauses 1-34, wherein the AC Taylor cone has a half angle less than 49°.

Clause 36. The method of any one of clauses 1-35, wherein the AC Taylor cone has a half angle of 11°.

Clause 37. The method of any one of clauses 1-36, wherein the back pressure is set slightly below a critical pressure of 2.4 kPa.

Clause 38. The method of any one of clauses 1-37, wherein the back pressure is set at about 1.6 to about 2.2 kPa.

Clause 39. The method of any one of clauses 1-38, wherein the droplet has a diameter size range of about 1 µm to about 10 µm.

Clause 40. The method of any one of clauses 1-39, wherein the tip streaming has a flow rate of about 5 nL/min.

Clause 41. The method of any one of clauses 1-40, wherein the method generates an encapsulation efficiency greater than 80%.

Clause 42. The method of any one of clauses 1-41, wherein greater than 85% of the single-cell encapsulated hydrogel beads have a concentric index (CI) below 0.8, indicating that most encapsulated single cells are centered within the hydrogel bead droplet.

Clause 43. The method of any one of clauses 1-42, wherein the single-cell encapsulated hydrogel beads are used as bio-ink for three-dimensional printing applications.

Clause 44. The method of any one of clauses 1-43, wherein the method eliminates the need for any further downstream sorting of empty droplets in complicated chips or flow cytometry sorters.

REFERENCES

1. Kamperman et al., "Single-Cell Microgels: Technology, Challenges, and Applications," *Trends Biotechnol.* 36(8): 850-865 (2018).
2. Kabat et al., "Trends in mesenchymal stem cell clinical trials 2004-2018: Is efficacy optimal in a narrow dose range?" *Stem Cells Transl. Med.* 9(1): 17-27 (2020).
3. Biol et al., "Encapsulation of angiogenic monocytes using bio-spraying technology," Integrative Biol. 4(6): 628-632 (2012).
4. Veiseh et al., "Size- and shape-dependent foreign body immune response to materials implanted in rodents and non-human primates," *Nat. Mater.* 14(6): 643-651 (2015).
5. Mao et al., "Deterministic encapsulation of single cells in thin tunable microgels for niche modelling and therapeutic delivery," *Nat. Mater.* 16(2): 236-243 (2017).
6. Lienemann et al., "Single cell-laden protease-sensitive microniches for long-term culture in 3D," Lab Chip. 17(4): 727-737 (2017).
7. Tomei et al., "Device design and materials optimization of conformal coating for islets of Langerhans," *Proc. Natl. Acad. Sci.* USA 111(29): 10514-10519 (2014).
8. Ingram, "Disintegration of water drops in an electric field," *Proc. R. Soc. Lond. A* 280 (1382): 383-397 (1964).
9. Gañán-calvo et al., "Review on the physics of electrospray: From electrokinetics to the operating conditions of single and coaxial Taylor cone-jets, and AC electrospray," *J. Aerosol Sci.* 125: 32-56 (2018).
10. Chetwani et al., "Universal cone angle of ac electrosprays due to net charge entrainment," *Phys. Rev. Lett.* 101(20): 204501 (2008).
11. Utech et al., "Microfluidic Generation of Monodisperse, Structurally Homogeneous Alginate Microgels for Cell Encapsulation and 3D Cell Culture," *Adv. Healthc. Mater.* 4(11): 1628-1633 (2015).
12. Xia et al., "Oxygen-Purged Microfluidic Device to Enhance Cell Viability in Photopolymerized PEG Hydrogel Microparticles," *Biomacromolecules* 17(7): 2459-2465 (2016).
13. Hanjaya-Putra et al., "Spatial control of cell-mediated degradation to regulate vasculogenesis and angiogenesis in hyaluronan hydrogels," *Biomaterials* 33(26): 6123-6131 (2012).
14. Zou et al., "Dynamic Supramolecular Hydrogels Spanning an Unprecedented Range of Host-Guest Affinity," *ACS Appl. Mater. Interfaces* 11(6): 5695-5700 (2019).

15. Pan et al., "Immersed AC electrospray (iACE) for monodispersed aqueous droplet generation," *Biomicrofluidics* 12(4): 44113 (2018).
16. Hanjaya-Putra et al., "Controlled activation of morphogenesis to generate a functional human microvasculature in a synthetic matrix," *Blood* 118(3): 804-815 (2011).
17. Gramlich et al., "Synthesis and orthogonal photopatterning of hyaluronic acid hydrogels with thiol-norbornene chemistry," *Biomaterials* 34(38): 9803-9811 (2013).

EXAMPLES

Example 1

Electrospray Setup

The experiment uses laser-pulled glass micropipette with a tip diameter of 30 μm (purchased from WPI, FL) [15]. The micropipette was housed in a plastic reservoir through a hole on its side wall (FIG. 1A). The reservoir was attached on a glass substrate with an indium tin oxide (ITO) layer (25×75 mm), which served as the counter electrode in the electrical system and was grounded. The alternating electric potential was generated from a function generator (Agilent) and amplified by a step-up transformer (Industrial Test Equipment, Port Washington, NY). The output potential was applied through an electrode inside the micropipette that is also in contact with the dispersed phase. All voltages mentioned in this report represent the root mean square voltage. A pressure regulator is used to control the pumping pressure on the aqueous phase. Images and videos were taken with a CCD camera (Retiga EXi, QImaging) connected to an inverted microscope.

Example 2

Cell Culture

Human breast cancer cells MDA-MB-231 were obtained from ATCC (HTB-26). Cells were thawed and expanded via serial passages. Cells were maintained at 37° C., 5% $CO_2$ in DMEM Medium (Cellgro, Corning) supplemented with 10% Fetal Bovine Serum and 1% antibiotics (penicillin and streptomycin).

Human multipotent mesenchymal stromal cells (hMSCs) from bone marrow were obtained from Promocell (C-12974). Cells were thawed and expanded via serial passages. The cells were grown and maintained in Complete Mesenchymal Growth Medium-2 (Promocell, C-28009) with additional 1% antibiotics (penicillin and streptomycin) at 37° C., 5% $CO_2$. Cells used for all experiments were between passage 4 and 7.

To induce osteogenic and adipogenic differentiation, hMSCs were switched to MSC Osteogenic Differentiation Medium (Promocell, C-28013) and MSC Adipogenic Differentiation Medium 2 (Promocell, C-28016), respectively. The cells were incubated in differentiation media for 7 days.

Example 3

Preparation of Suspended Cells

Cell suspension preparation for encapsulation was conducted based on standard procedure [16]. Briefly, to obtain suspended cells, adherent cells were detached by trypsin/EDTA (Promocell, C-41020) for 5 min. Centrifugation was performed (300×g, 5 min) to remove the trypsin-containing supernatant and to pellet the cells. Cells were then resuspended in PBS at a high concentration ($1-2\times10^8$ cells/mL). Prior to spraying, dispersed individual cells were achieved by pipetting the cell suspension multiple times followed by filtering it through a 40 μm mesh strainer.

Example 4

Cell Viability

Viable cells were visualized by staining the nuclei with 10 μg/mL Hoechst 3342 (Invitrogen, H3570) and the cell membrane with 2 μM calcein AM dye for 20 min at room temperature. Dead cells were determined as stained with 4 μM ethidium homodimer-1 (Invitrogen, L3224) for 30 min at room temperature. Cell viability was quantified before spraying, immediately after spraying (0 hr), and 3 days after spraying (72 hr) using fluorescent microscopy and ImageJ.

Example 5

Quantification of Differentiated Cells

Osteogenic differentiation was detected by staining the cells with Alizarin Red S for extracellular calcium deposits. A 2% Alizarin Red S solution (Sigma-Aldrich, A5533) was prepared in $dH_2O$ then filtered to remove debris. The solution pH of 4.1-4.3 was adjusted by hydrochloric acid or ammonium hydroxide. The cells were washed with PBS then fixed with methanol 95% for 10 min and washed again with $dH_2O$. Staining was performed by incubating the cells with the Alizarin Red S solution for 30 min. After that, the cells were rinsed with $dH_2O$ and kept in $dH_2O$ for immediate imaging. The percentage of differentiated cells was calculated and compared between adherent cells and encapsulated cells. For further quantification of calcium deposits and comparison between control cells and differentiated cells, the absorbance at 520 nm of each well was measured.

Adipogenic differentiation resulted in the formation of lipid droplets within the cells, which could be identified by staining with Oil Red O solution (BioVision, K580-24). Following the protocol suggested by the manufacturer, briefly, the cells were washed with PBS and fixed with 10% formalin for 30 min. The fixed cells were then stained with Oil Red O solution and the cell nuclei could be counterstained with Hematoxylin. As stained, the lipid droplets appeared in red color in microscopic images. Finally, Oil Red O stain can be extracted by isopropanol and the resulting solutions could be quantified by reading the absorbance at 492 nm.

Example 6

Encapsulation Experiments

Alginate crosslinking was induced using the Ca-EDTA complex to deliver the calcium ion for gelation [11]. Ca-EDTA complex was made by mixing equal molar of calcium chloride and ethylenediaminetetraacetic acid (EDTA) in HEPES-buffered DMEM (Sigma-Aldrich) solution at pH 7.4. 2% w/w Alginate (300 kDa, low viscosity, Sigma) was then added into the solution and fully dissolved. Cells were added to the mixed solution before electrospray at a final concentration of $5\times10^7$ cells per mL. Crosslinking of the gel coating was achieved by adding 0.01% acetic acid (Sigma) to the oil phase for 2 minutes. The cells were extracted to cell media through centrifugation after adding 10% w/w 1H,1H,2H,2H-perfluorooctanol (PFO). Staining of alginate was achieved by substituting FITC-labeled alginate (Creative PEGWorks, NC) for 20% of the original alginate solution.

Collagen I (Corning®, 354249) was first neutralized with 100 mM HEPES (pH 7.3 in 2×PBS) before mixing with cells at a final concentration of 2.5 mg/mL. Staining of collagen was achieved by incubating with NHS-FITC (5/6-carboxyfluorescein succinimidyl ester, Thermo Fisher) according to manufacturer's instruction on ice for two hours following instruction provided by the manufacturer. To prevent premature gelation of collagen, all the preparation and encapsulation steps were performed with cooling using ice. Crosslinking of the collagen was achieved by incubating the water-in-oil emulsion at 37° C. for 30 minutes.

NorHA was synthesized using an established protocol [16]. NorHA gel precursor solution contained 1.2% NorHA with 0.8 ratio of dithiothreitol (DTT). Water soluble photoinitiator lithium phenyl-2,4,6-trimethylbenzoylphosphinate (LAP) was used at 0.2% (w/v) unless otherwise stated and was purchased from Sigma-Aldrich. After collecting the cell laden microgel droplets in a microcentrifuge tube, OmniCure® Series 1500 was used for crosslinking the NorHA precursor solution for 5 sec with UV exposure (10 mW cm$^{-2}$, 365 nm). To visualize the gel layer, 2 mM rhodamine-thiol dye (Kerafast, Boston, MA) was incorporated into NorHA using light-mediated thiol-norbornene chemistry [17]. The cells were extracted to cell media through centrifugation using 25% w/w 1H,1H,2H,2H-perfluorodecanol (PFD).

All extraction was performed in a centrifuge at 200×g for 3 minutes. The continuous phase consists of 1% w/w biocompatible fluorosurfactant (RAN Biotechnology, MA) in fluorinated oil (3M Novec Engineering HFE7500).

Example 7

Rheological Measurement

NorHA gels precursor solution containing 1.2% (w/v) NorHA, dithiothreitol (DTT, 0.8 ratio), and 0.2% (w/v) water soluble photoinitiator LAP was transferred to syringes with their tips removed, covered with a coverslip, and irradiated with UV light (10 mW cm$^{-2}$, 365 nm) for 5 seconds. NorHA gels were incubated with PBS overnight before mechanical testing. The mechanical properties of the hydrogels were tested using a TA Instruments Discovery HR-2 rheometer. Oscillatory time sweeps were performed on three samples (n=3) at a strain of 0.64% and a frequency of 1 Hz to measure the storage modulus (G') and loss modulus (G"). The Young's modulus (substrate elasticity) was calculated following $E=2G'(1+v)$ using an average Poisson's ratio (v) of 0.5.

Example 8

"Tip Streaming" Mode of AC Electrospray

With the appropriate back pressure and a direct current (DC) electric potential applied across a liquid interface, the interface becomes charged and forms a sharp conic structure with a 49° half angle (Taylor cone) [8]. Despite earlier attempts to exploit the sharp conic structure to encapsulate cells, multiple cells are encapsulated in a single droplet, which is often attributed to recirculation within the Taylor cone [9]. However, a recent discovery shows that an AC field can produce a much sharper cone (11°) due to dielectric polarization, rather than the direct ion charging of the DC cone [11]. This slender AC cone cannot sustain a recirculation flow and ejects electroneutral droplets much larger than the charged droplets of DC Taylor cone. Such droplet generation from the AC cone is termed "tip streaming" (FIG. 1A). Stable AC cone and tip streaming only occurs at frequencies beyond the inverse charge relaxation time of the orifice $D/\lambda R \sim 10$ KHz, where D is the diffusivity of the dominant ion ($\sim 10^{-5}$ cm$^2$/s), $\lambda$ is the Debye length of the cell solution (~few nm for the typical cell medium in the dispersed phase) and R~20 microns is the orifice radius. The choice of the frequency should also avoid field penetration into the cell beyond megahertz. The work described herein demonstrates the first successful encapsulation of the cells with the tip streaming mode of the AC cone at an alternating frequency of 300 KHz.

Figure 1B:
FIG. 1B shows snapshots of an MDA-MB-231 cell being ejected through "tip streaming" in alginate solution at high (300 kHz) and low (1 kHz) frequencies.
Figure 1B:
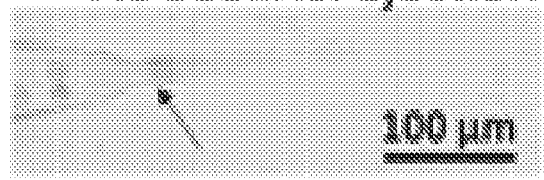
Figure 1B:
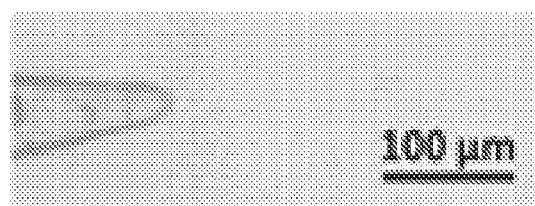
Figure 1B:
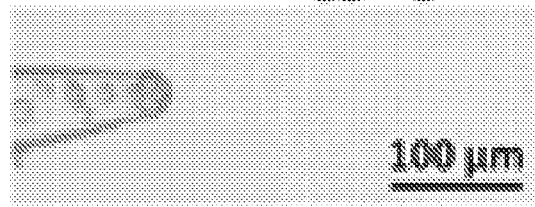

To demonstrate the universality of the technology across different cell types, the breast cancer cell line MDA-MB-231 and hMSCs are used experimentally as model cell lines. Consistent with previous observations, at low frequencies below the inverse charge relaxation time of 10 kHz, a DC Taylor cone is still observed. An incoming cell often fails to block the flow supplying the tip streaming and starts to recirculate within the conic area until enough cells aggregate at the tip. The aggregated cells are eventually ejected collectively in a single droplet, as shown in FIG. 1B. This multi-cell encapsulation phenomenon is consistent with earlier findings with DC sprays [10].

The broad Taylor cone at low frequencies evolves into the slender AC cone at frequencies higher than the inverse charge relaxation time and each cell is packed into a cone apex without recirculating (FIG. 1B). Since the tip of the AC cone has a diameter much smaller than the cell, the flow is essentially blocked by this cell at the cone apex and the trailing cells can no longer advance. The apex then pinches off to generate a droplet containing a single cell, while multiple cells may exist in the trailing conic region. There is hence a gating action much like a ball check valve in a funnel.

Example 9

Conformal Single-Cell Hydrogel Coating

In order to minimize the effect of the electric field on the cells, the voltage potential at the lower end for tip streaming was chosen and found to be around 420 V for 300 KHz. The appropriate applied pressure is chosen to ensure both the formation of the streaming cone and a high flow rate. It is found that when the applied pressure is higher than a critical pressure 2.4 kPa dripping droplets with 30 microns to 40 microns in diameter are created. Therefore, the applied pressure is set slightly below the critical pressure at 1.6-2.2 kPa. During tip streaming, tiny liquid droplets which have a size range between one to ten microns are emitted from the cone apex as shown in FIG. 1B. When no cells are present near the cone, tip streaming has a flow rate of about 5 nL/min (estimated based on the cell moving speed in the pipette) for the chosen parameters described above. The cells are emitted at a frequency of ~100 Hz. It is important to note that the droplet generation frequency for the tiny tip streaming droplets was not characterized as they are often below the diffraction limit.

After dispersing the cells, the hydrogel layer is crosslinked by different methods depending on the hydrogel materials, as shown in FIG. 1A. For crosslinking alginate and collagen gels, acetic acid and heat incubation were respectively used. NorHA precursor solution, on the other hand, was crosslinked using irradiation with UV light (10 mW/cm$^2$, 365 nm) for 5 seconds. In order to ensure the cell is completely encapsulated by the hydrogel layer after the crosslinking process, the emulsion is first placed in an orbital shaker at 1000 rpm for two minutes to drive the cell closer to the center of the droplet without affecting the droplet monodispersity [6]. Immediately after shaking the droplets, the alginate droplets are crosslinked by adding 0.01% v/v acetic acid to the oil for two minutes and the collagen droplets are gelled by incubation at 37° C. for 30 minutes.

Extraction of the droplets into cell medium is achieved by centrifugation after adding cell medium to the centrifuge tube containing the emulsion. During extraction, the interfacial tension between the cell medium and oil phase is reduced by using 1H,1H,2H,2H-perfluorooctanol (PFO) for alginate and collagen. Most empty droplets generated from "tip streaming" are more than ten times smaller than the encapsulated single-cell particles in volume; thus, the majority of them can be left in the oil phase by choosing a proper concentration of PFO that allows the larger cell-encapsulated beads to cross over the water/oil interface but not the smaller streaming droplets.

Example 10

Characterization of the Encapsulated Cells

Figure 2A:
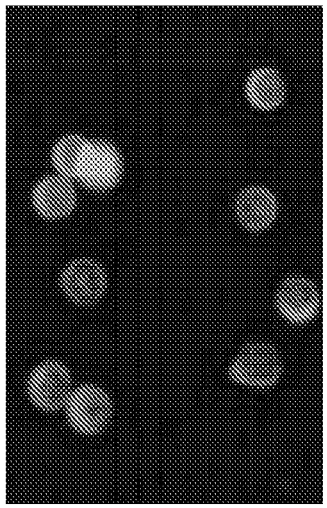
FIG. 2A shows MDA-MB-231 cells encapsulated in alginate gel. Green: alginate gel; Blue: cell nucleus.
Figure 2B:
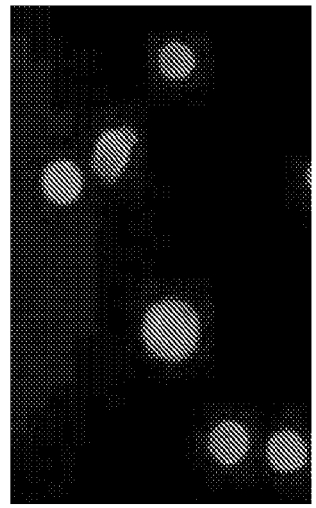
FIG. 2B shows MDA MDA-MB-231 cells encapsulated in collagen gel. Green: collagen gel; Blue: cell nucleus.
Figure 2C:
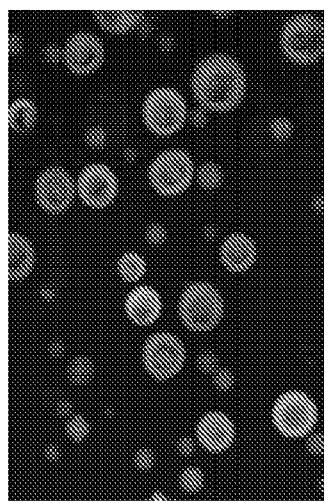
FIG. 2C shows alginate gel particles extracted using 20% w/w PFO including both empty streaming droplets and encapsulated cells. Green: alginate gel; Blue: cell nucleus.
Figure 2D:
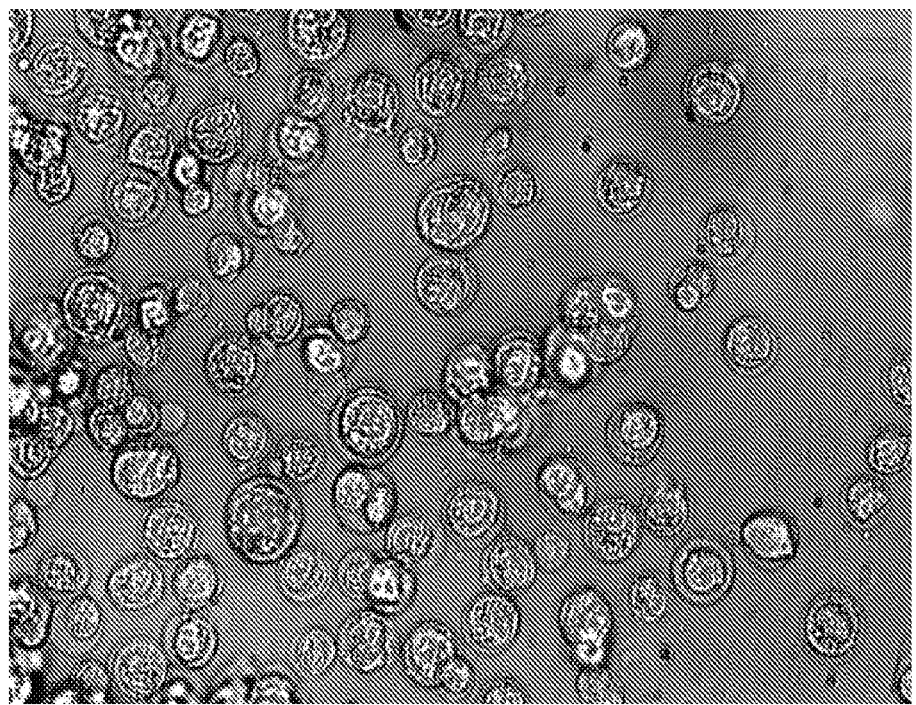
FIG. 2D shows MDA-MB-231 cells encapsulated in NorHA microgels extracted using 25% w/w PFD including both empty streaming droplets and encapsulated cells. Blue: cell nucleus. Scale bars: 50 μm.
Figure 2E:
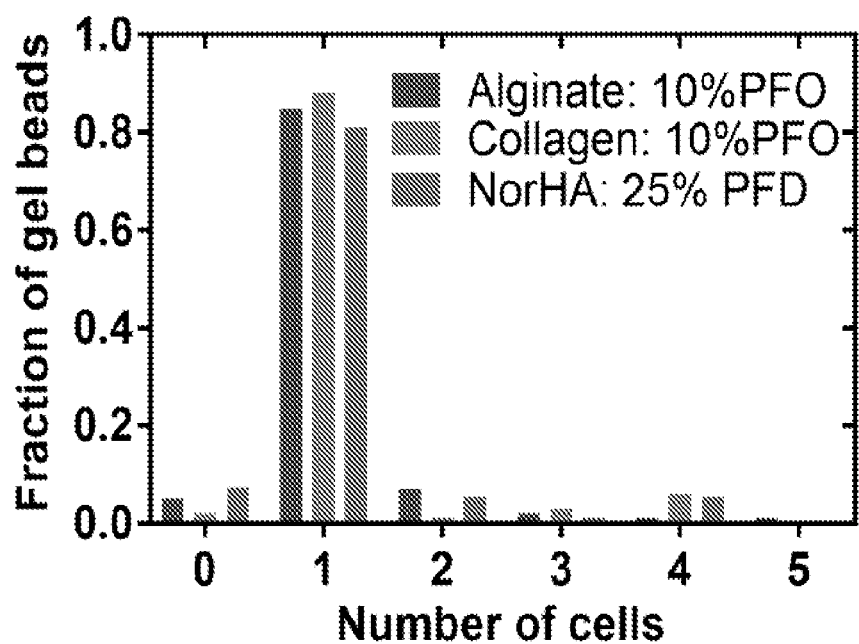
FIG. 2E shows the fraction of encapsulated cells per microgel bead.
Figure 3A:
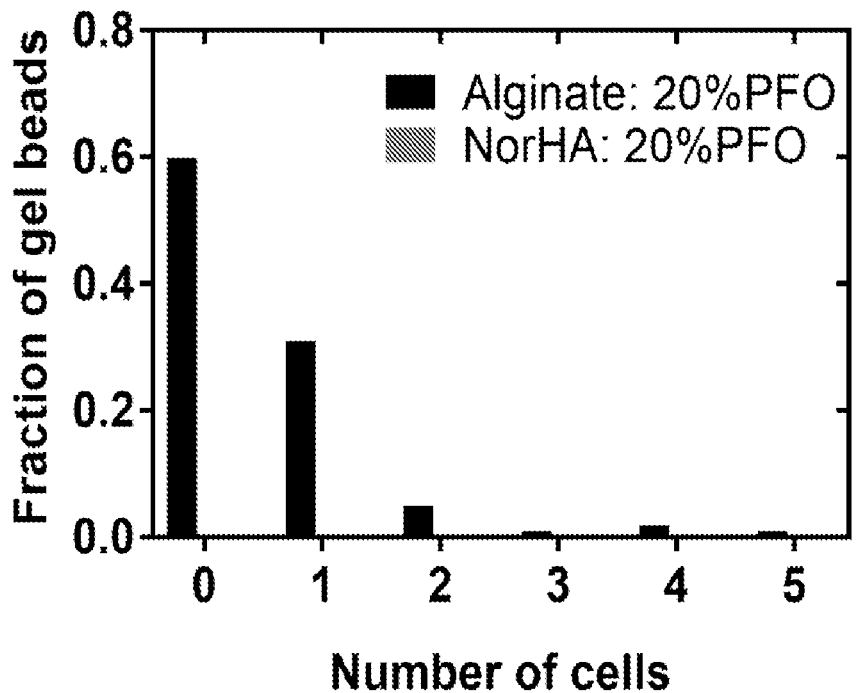
FIG. 3A shows alginate gel particles extracted using 20% w/w PFO including both empty streaming droplets and encapsulated cells. For NorHA microgels, 20% w/w PFO proved ineffective to transfer any microgels from oil phase to liquid phase.

Visualization of the microgels was done using FITC-labeled alginate and NHS-FITC dye to label the primary amine group in the collagen gel (FIG. 2A-C). It was found that using a PFO concentration of 10% w/w allows for the extraction of most cell-encapsulated alginate and collagen beads, but most small empty particles were left behind in the oil phase, as shown in FIG. 2A-B. While keeping the centrifugal force and time the same, a significant amount of empty alginate gel particles from streaming droplets is extracted using 20% w/w PFO, as shown in FIG. 2C and FIG. 31A. Using this method at the same centrifugation force, the sorting of cell-loaded droplets is demonstrated by controlling the interfacial tension and increasing the single cell laden droplet percentage using either alginate or collagen from 30% to more than 80%, as shown in FIG. 2D and FIG. 3A. For the NorHA microgel, however, 20% w/w PFO was not sufficient to break the interfacial surface tension between the microgel and the oil (FIG. 3A). Instead, using 25% of 1H,1H,2H,2H-perfluordecanol (PFD) allowed for the extraction of 81% single cell laden microgel from the water oil emulsion (FIGS. 2D-E), whereas using 10% PFD did not allow the extraction of any cell laden microgels from the oil phase. It is suspected that the difference in interfacial surface tension allows for the isolation of these microgels with different types of perfluorocarbon liquids.

Figure 4A:
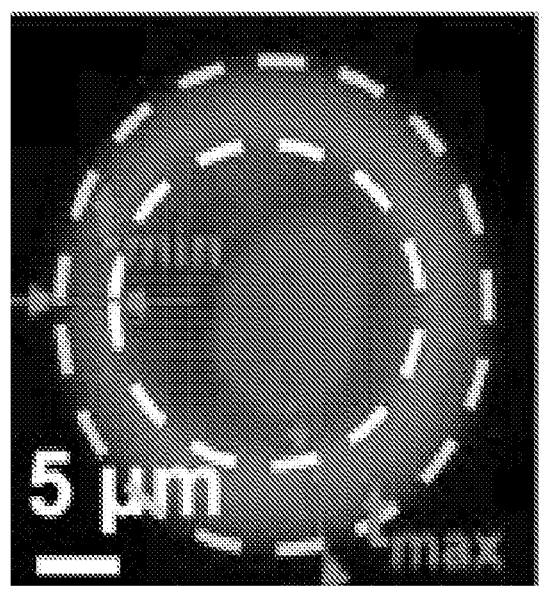
FIG. 4A shows a representative image of an MDA-MB-231 cell encapsulated in an alginate gel particle. The cell occupies the middle region of the bead with lighter fluorescence intensity. White dashed lines delineate cell boundaries.
Figure 4B:
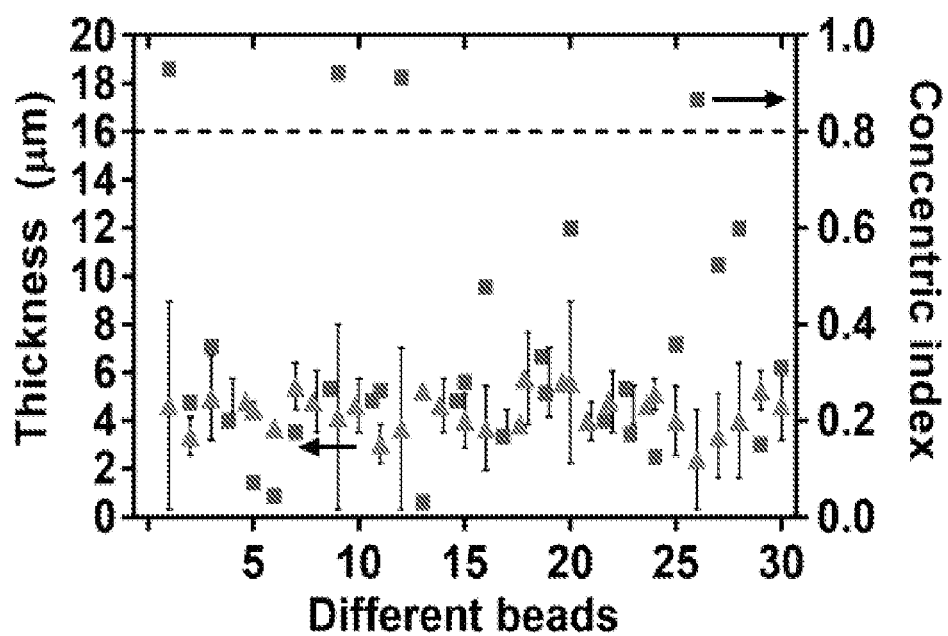
FIG. 4B shows gel layer thickness (red triangle) and concentric index (blue square) of 30 randomly chosen single-cell-encapsulated alginate gel particles.
Figure 4C:
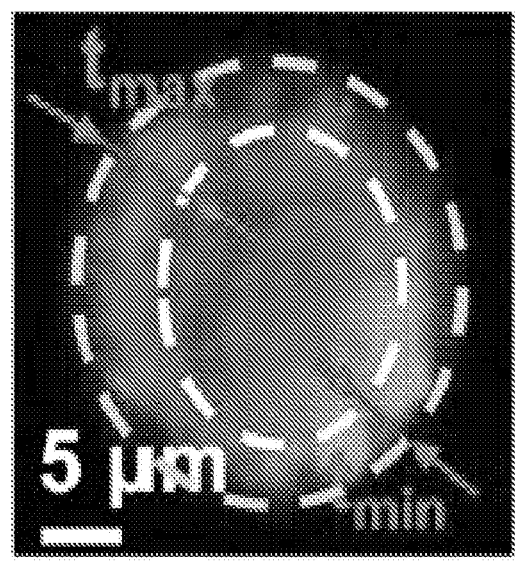
FIG. 4C shows a representative image of an MDA-MB-231 cell encapsulated in a collagen gel particle.
Figure 4D:
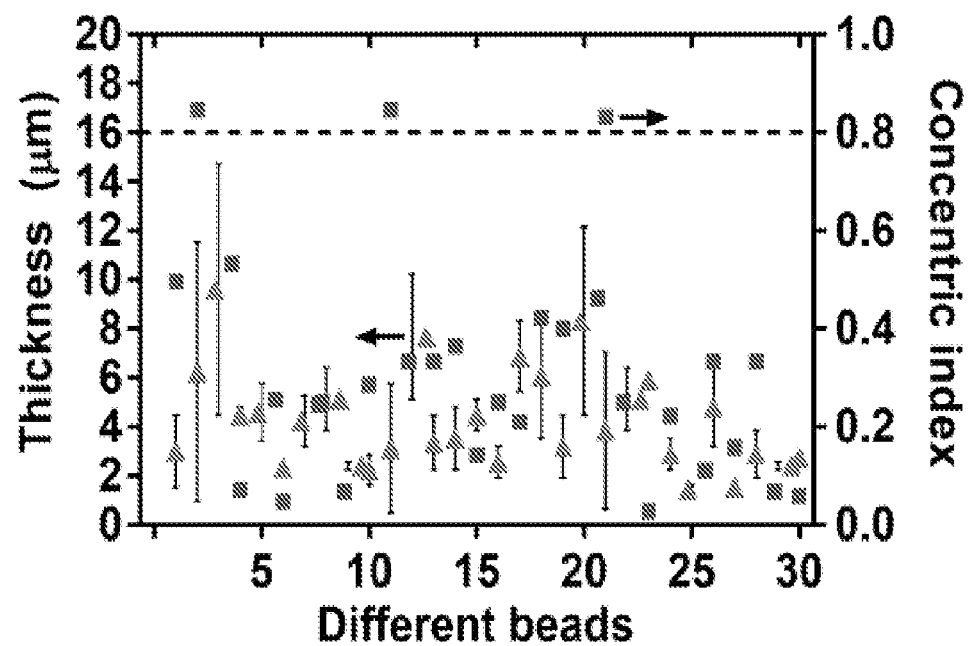
FIG. 4D shows gel layer thickness (red triangle) and concentric index (blue square) of 30 randomly chosen single-cell-encapsulated collagen gel particles.
Figure 4E:
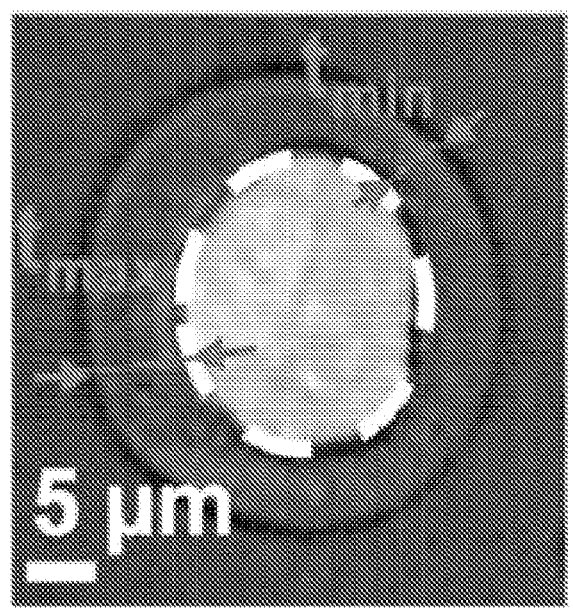
FIG. 4E shows a representative image of an MDA-MB-231 cell encapsulated in a NorHA gel particle.

To further characterize the single-cell encapsulated microgels, their morphologies were studied using light and fluorescence microscopy techniques. Representative images of alginate, collagen, and NorHA encapsulated MDA-MB-231 cells are shown in FIGS. 4A, 4C, and 4E respectively. The lighter green area indicates the volume of the cell and the darker green area indicates the hydrogel layer of alginate and collagen gels. NorHA microgels, on the other hand, were modified with thiol-dyes to indicate the hydrogel layer in red and the volume of the cell in green.

Thirty randomly chosen single-cell beads are analyzed for each case. For each single-cell bead, the minimum thickness ($t_{min}$) and the maximum thickness ($t_{max}$) of the gel layer can be measured as shown by the bars in FIGS. 4B, 4D, and 4F. The average thickness of the hydrogel layer is taken by the average of $t_{min}$ and $t_{max}$. The alginate, collagen and NorHA encapsulated hydrogel beads have an average thickness of 4.4±0.8, 4.1±2.0, and 2.85±1 μm, respectively. To better evaluate how close the cell is placed to the center of the gel bead, concentric index (CI) is defined as:

$$CI = \frac{t_{max} - t_{min}}{t_{max} + t_{min}}$$

Figure 4F:
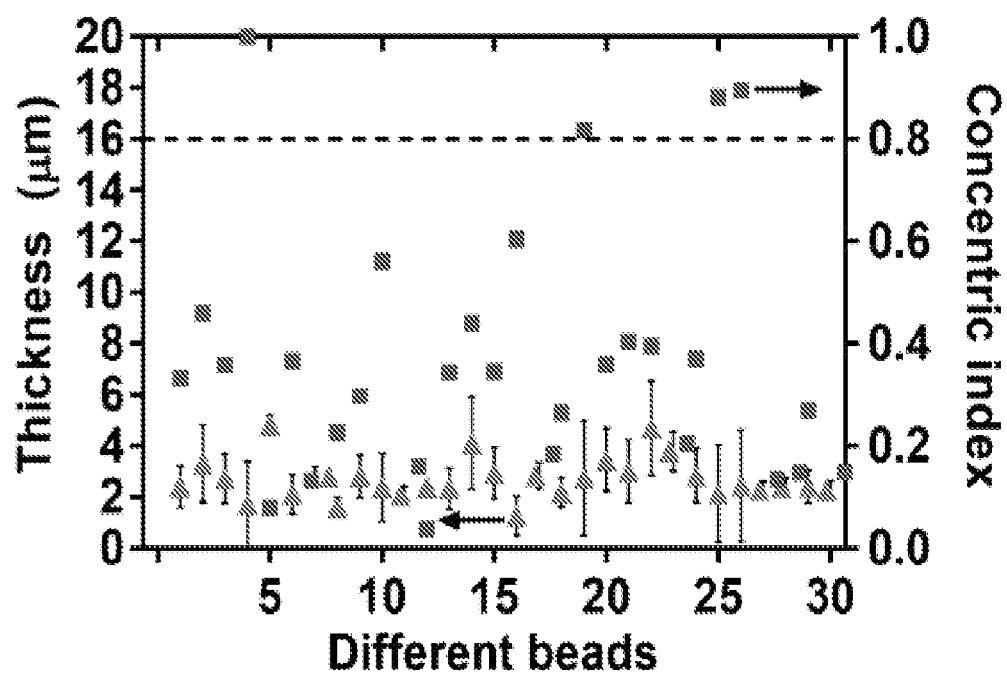
FIG. 4F shows gel layer thickness (red triangle) and concentric index (blue square) of 30 randomly chosen single-cell-encapsulated NorHA gel particles.
Figure 4G:
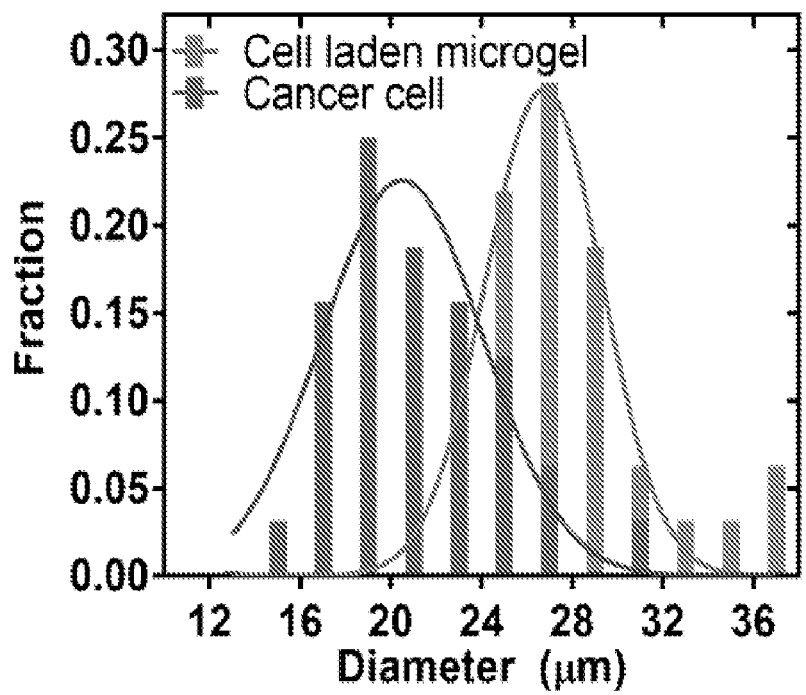
FIG. 4G shows the distribution of microgels and cells from FIG. 4F, depicting conformal coating.

When a cell is placed at the most center of the bead, CI is equal to zero; when the cell is placed at the edge of the bead, CI is equal to one. If an arbitrary value of CI of 0.8 is used to classify the single-cell beads into centered and off-centered groups, more than 86% beads are centered, as shown in FIGS. 4B, 4D, and 4F.

Figure 3B:
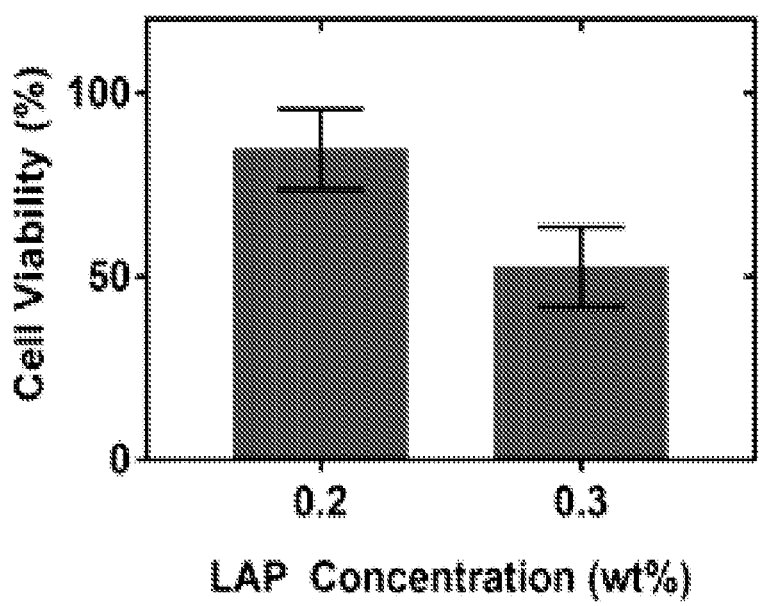
FIG. 3B shows the viability of cells immediately after cell encapsulation using 0.2% and 0.3% LAP concentration at the same UV exposure.
Figure 4H:
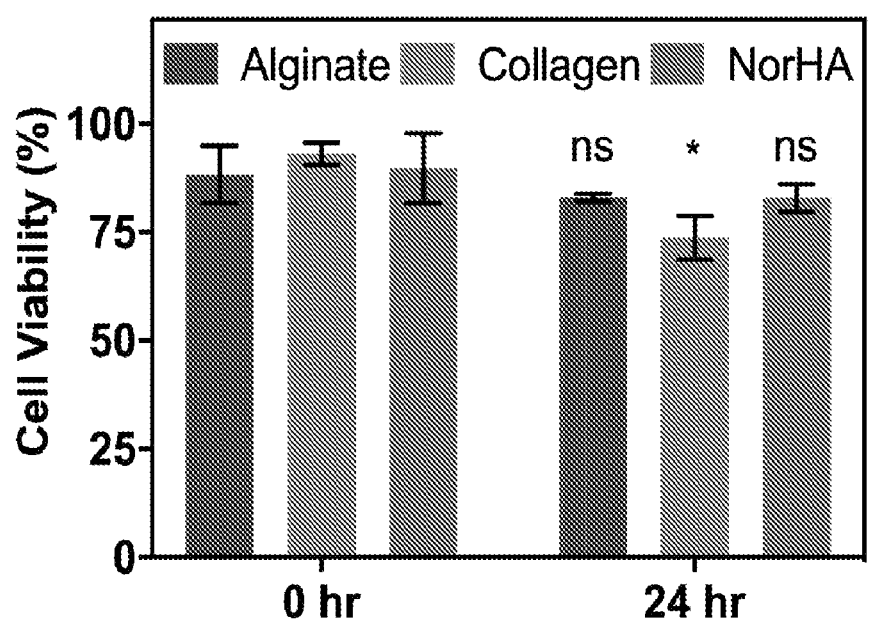
FIG. 4H shows the viability of single cells encapsulated in alginate or collagen particles right after encapsulation and after 24 hours. Pair sample t test P-values=0.32, 0.028, and 0.15 for alginate, collagen, and NorHA encapsulated cells, respectively.

The viability of the MDA-MB-231 cells is studied using ethidium homodimer-1 staining and a live/dead cell viability assay. Cell viability immediately after microgel encapsulation was 88.25±6.63% and 93.14±2.65% for alginate and collagen, respectively. The viability remained 82.97±0.9% and 73.81±5.14% after 24 hours in vitro for the alginate and collagen encapsulated cells, respectively. Since the NorHA gel is polymerized using free radical polymerization, the photo-initiator (e.g., LAP) concentration plays a very important role in prolonged cell viability [12]. The free radicals generated by the UV dosage may affect cell viability, unless they are all consumed in a reaction. A higher LAP concentration leads to faster gelation kinetics, but the excessive free radicals formed cause detrimental effects on cells. The viability of cells immediately after spraying was studied using two photo-initiator concentrations of 0.2% (w/v) and 0.3% (w/v) for the same UV exposure (10 mW cm$^{-2}$, 365 nm, 5 seconds), as shown in FIG. 3B. The 0.3% (w/V) LAP concentration showed less than 60% cell viability, while 0.2% (w/v) showed more than 84% cell viability immediately after cell encapsulation. The optimized LAP concentration was used to obtain 89.75±8.01% cell viability immediately after encapsulation and more than 80% of the cells were alive after 24 hours in vitro for the NorHA microgel, as shown in FIG. 4H.

Example 11

Differentiation Potential of NorHA Hydrogel Encapsulated hMSCs

Figure 5A:
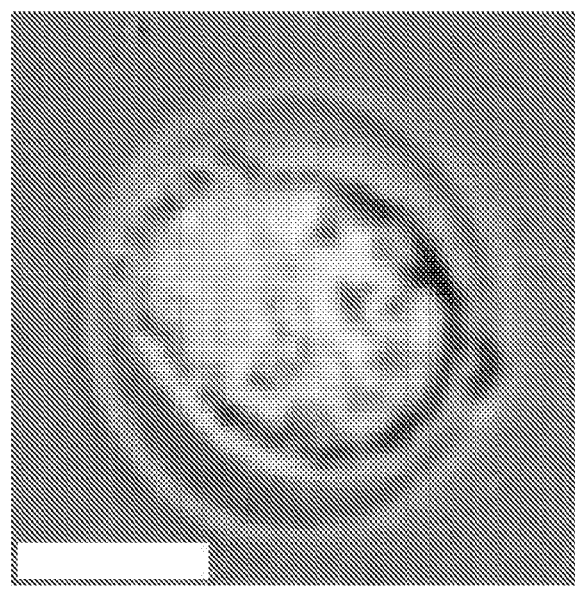
FIG. 5A-G show hMSC encapsulation and differentiation within NorHA microgel.
Figure 5B:
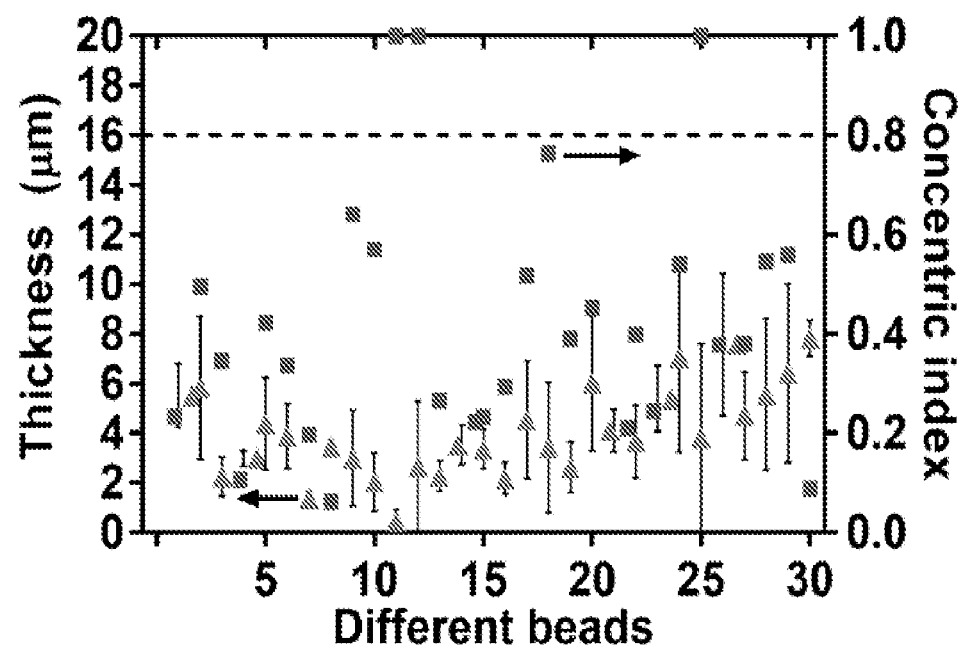
Figure 5C:
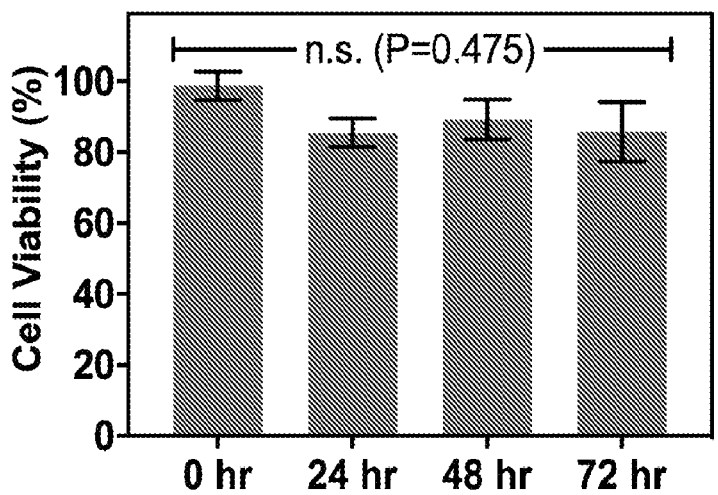
Figure 5D:
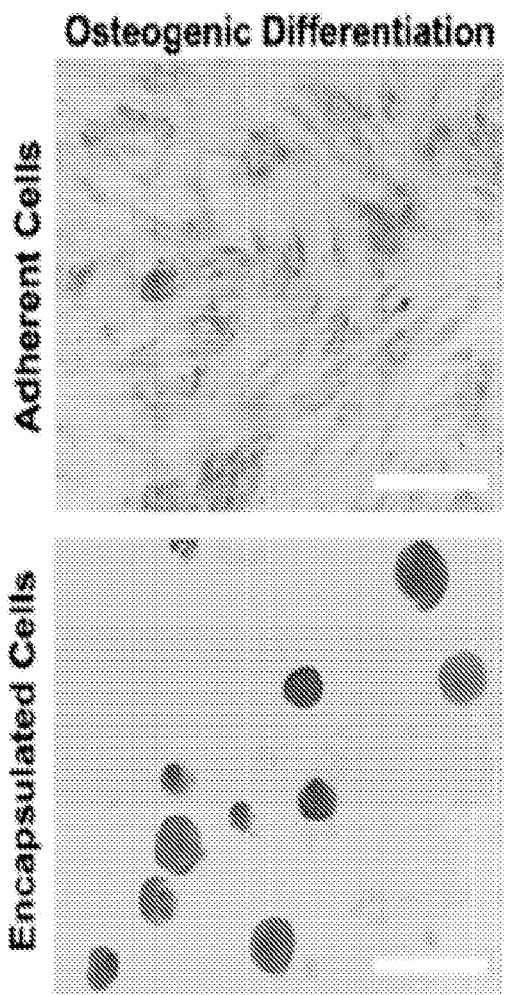
Figure 5E:
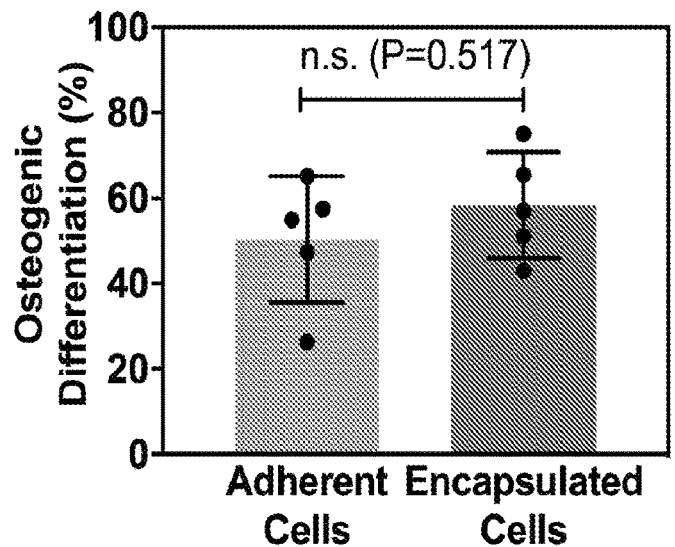
Figure 5F:
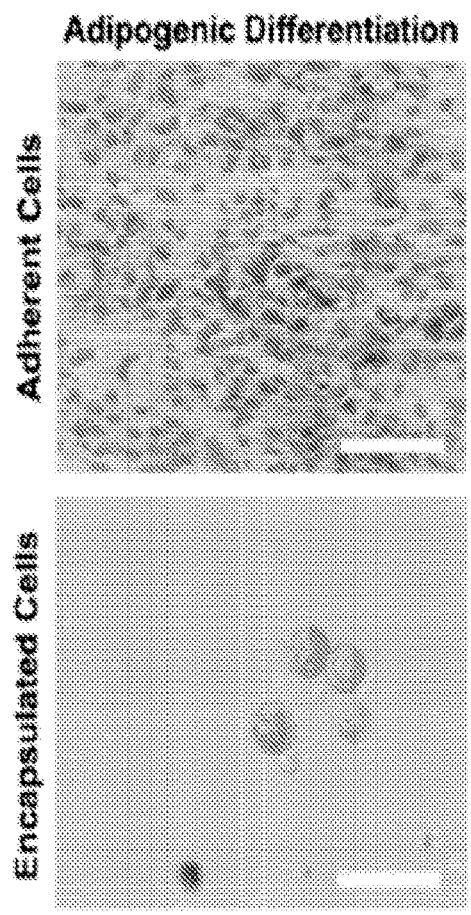
Figure 5G:
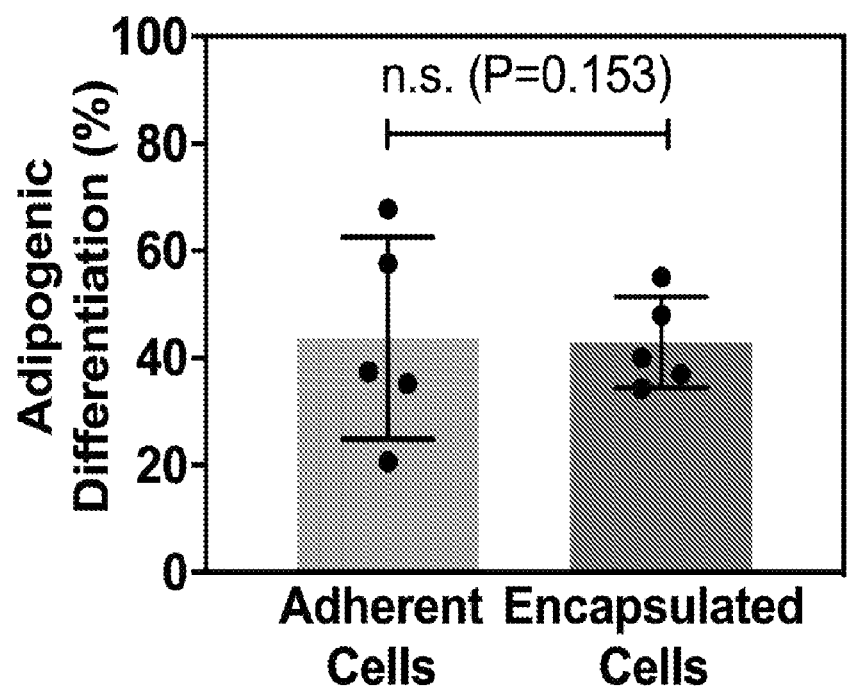
Figure 6A:
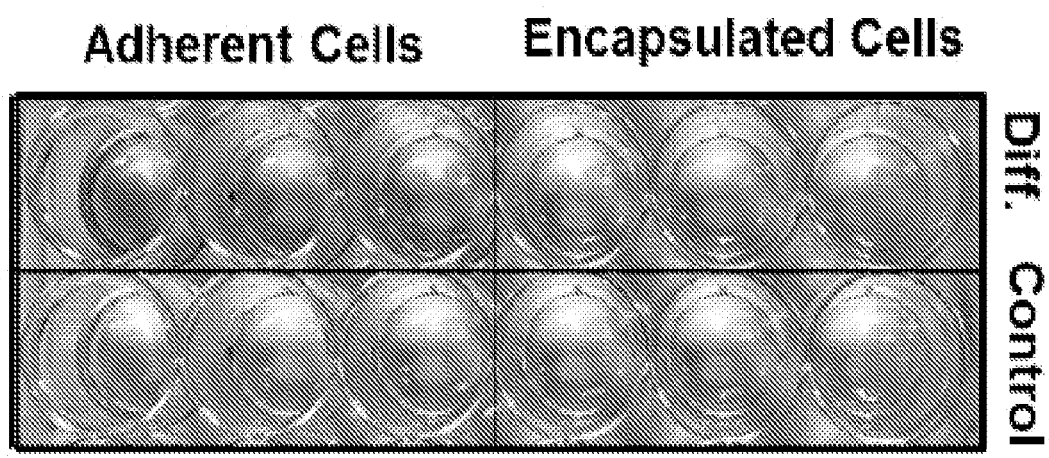
FIG. 6A shows macroscopic appearance of osteogenic differentiated hMSCs cultured on well plates (Adherent Cells) and encapsulated within NorHA gel (Encapsulated Cells) after stained with Alizarin Red S Solution. To initiate differentiation, hMSCs were maintained in Osteogenic Differentiation Medium (Diff.) for 7 days. Non-differentiation cells were maintained in control MSC Growth Medium (Control/Culture).
Figure 6B:
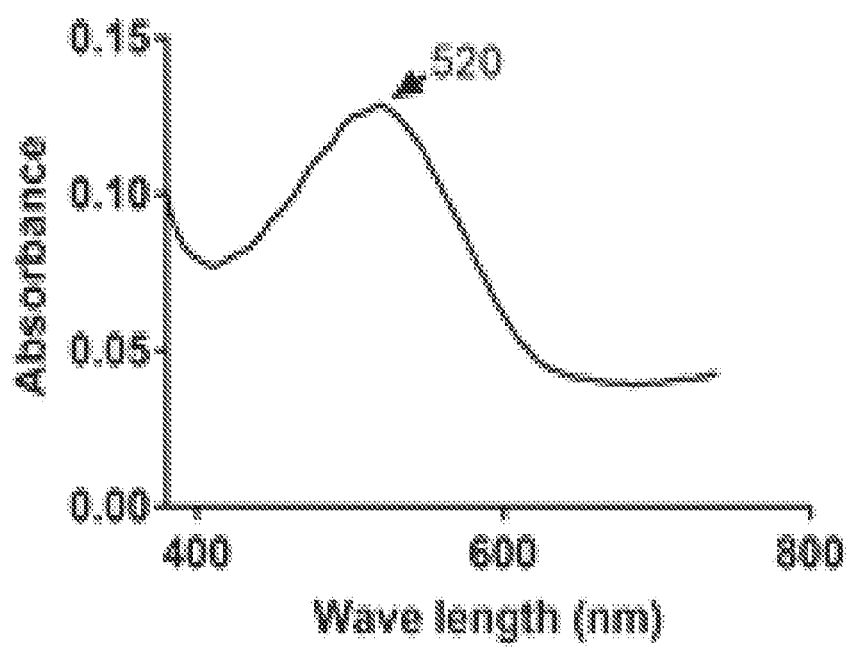
FIG. 6B shows the absorbance spectrum of Alizarin Red S solution as stained for calcium mineralization. Maximal absorbance was observed at 520 nm.
Figure 6C:
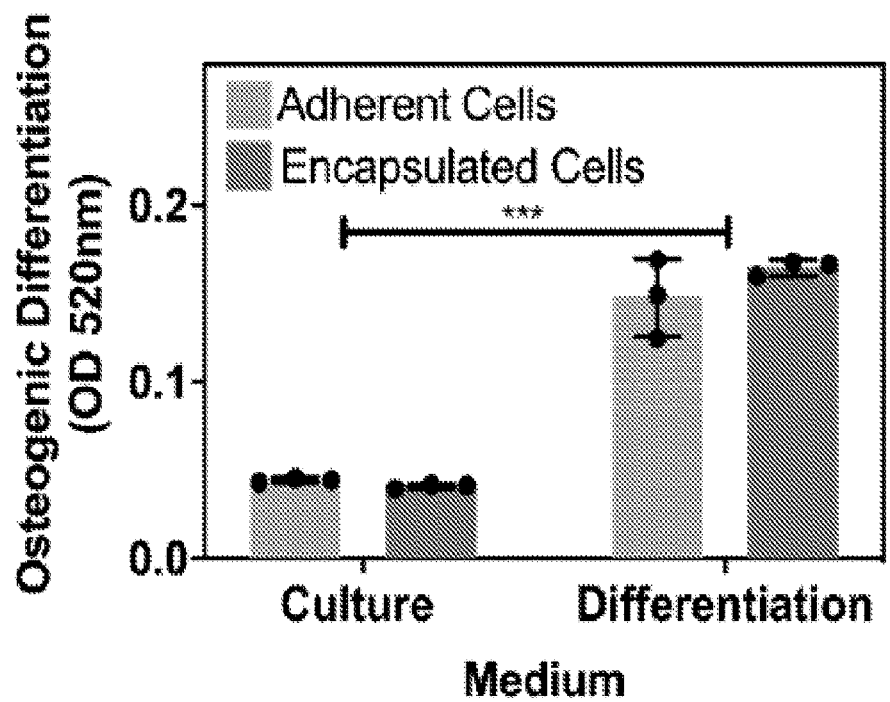
FIG. 6C shows the quantification of the extracted Alizarin Red S stain in each well, which was performed by measuring the absorbance at 520 nm. *P-value<0.001.
Figure 6D:
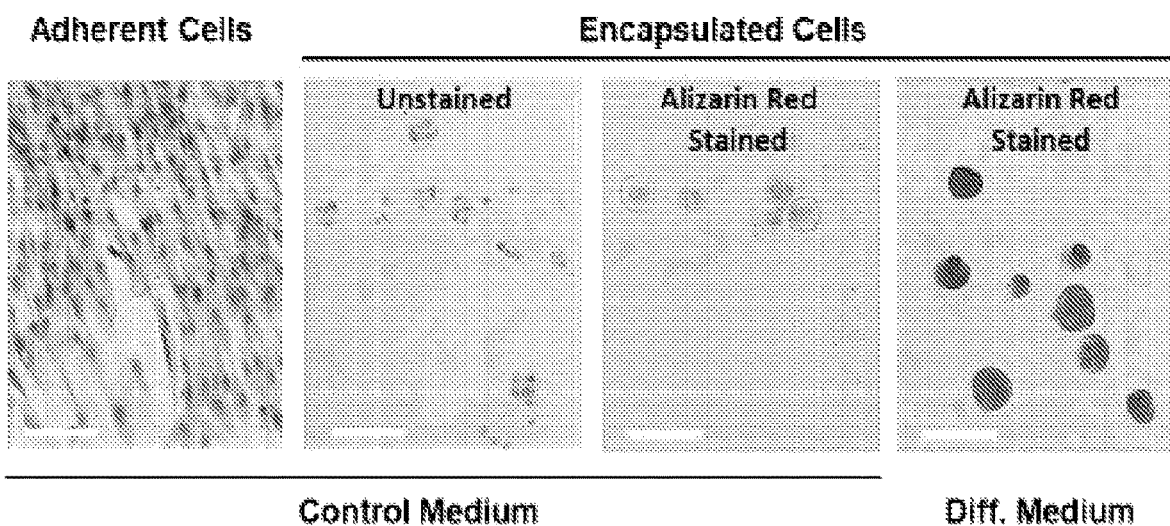
FIG. 6D shows representative images of adherent and encapsulated cells cultured in MSCs growth medium (Control Medium) and in osteogenic differentiation medium (Diff. Medium). Encapsulated cells were stained with Alizarin Red S Solution to visualize the calcium mineralization. Scale bars are 100 µm.
Figure 6E:
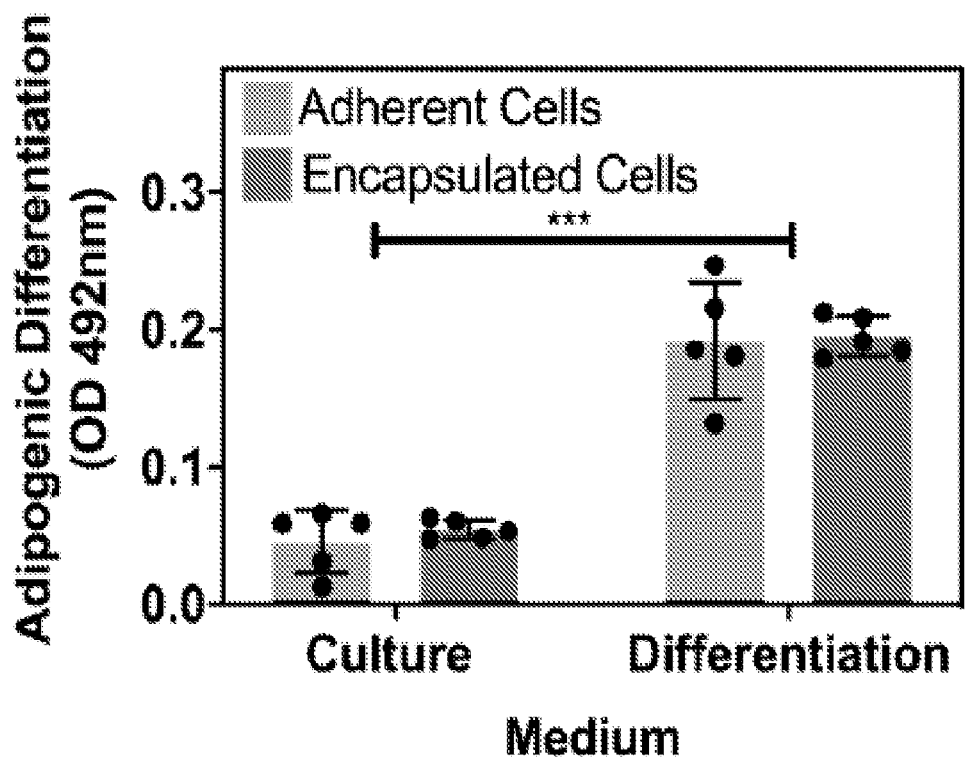
FIG. 6E shows the quantification of lipid content performed by measuring the absorbance of the resulting solution at 492 nm, where stain was extracted in isopropanol. *P-value<0.001.
Figure 7A:
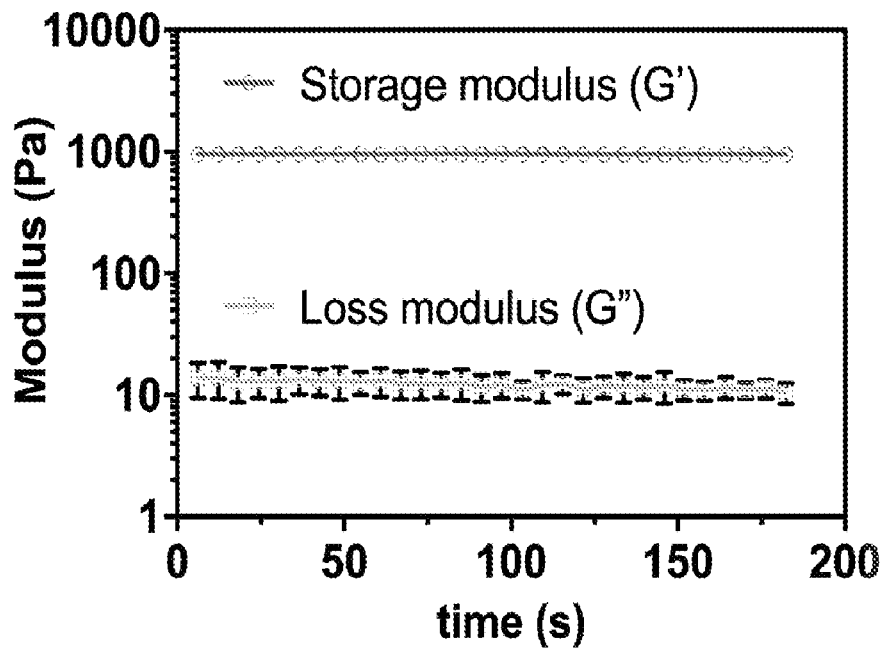
FIG. 7A shows the storage modulus (G') and loss modulus (G") of NorHA hydrogels, which were measured at a constant 1 Hz frequency and 0.64% strain.
Figure 7B:
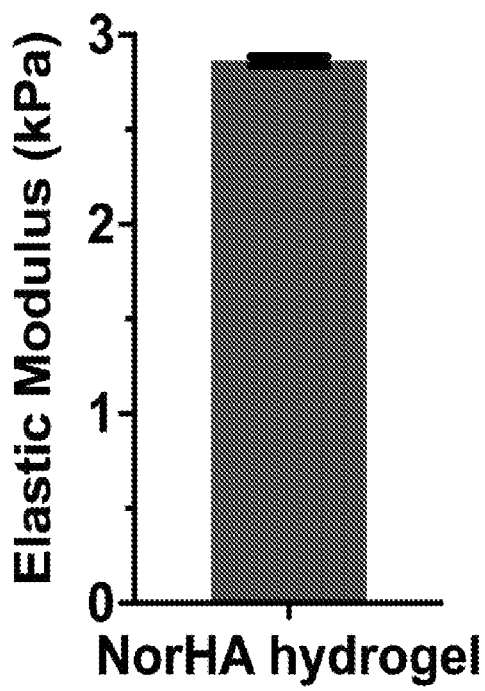
FIG. 7B shows the elastic modulus (kPa) of NorHA hydrogels, which was calculated following E=2G'(1+v), assuming that the passion ratio (v) is 0.5 for polymeric hydrogels. Data represents the mean±S.D. for three samples.

Since hyaluronic acid hydrogels have previously been shown to support self-renewal of stem cells, tissue morphogenesis, and angiogenesis, and because NorHA has mild cross-linking conditions compared to alginate and collagen hydrogels as well as high cell viability with MDA-MB-231 cells, further investigation using NorHA hydrogels to encapsulate hMSCs was performed to study their differentiation potential. Single hMSCs were first encapsulated in a thin layer of the NorHA microgel having an average thickness of 4.0±1.8 μm, as shown FIG. 5A-B. The viability of the encapsulated hMSCs was found to remain above 80% with respect to the control hMSCs for three consecutive days, as depicted in FIG. 5B. Furthermore, in order to evaluate their differentiation potential, the encapsulated hMSCs were cultured in either osteogenic or adipogenic differentiation medium. For osteogenic differentiation, calcium deposits were detected by Alizarin Red S staining in both adherent and encapsulated cells (cultured in osteogenic differentiation medium), which are significantly different from control cells maintained in growth medium (FIG. 5C and FIG. 6). It is important to note that control hMSCs maintained in growth medium do not stain positive for Alizarin Red S, which may suggest that Alizarin Red S does not demonstrate non-specific binding to the NorHA hydrogels (FIG. 6). More importantly, a significant difference in the osteogenic differentiation potential between the encapsulated cells (58.34±12.40%) and adherent cells (50.26±14.76%) was not observed, as shown in FIG. 5D. For adipogenic differentiation, lipid droplets were also detected in both adherent and encapsulated cells, which were cultured in adipogenic differentiation medium, as shown in FIG. 5E and FIG. 6. There was no significant difference observed in the adipogenic differentiation potential between the adherent and encapsulated cells (FIG. 5F). These observations are consistent with previous studies that suggest that HA hydrogels with a moderate elastic modulus (2.86±0.02 kPa; FIG. 7) and cultured in the appropriate differentiation medium can support the osteogenic and adipogenic differentiation of hMSCs.

NorHA conditions with fixed rheological and mechanical properties (FIG. 7) were chosen to demonstrate the feasibility of the technology to support the viability and differentiation potential of hMSCs. However, this unique technology can be broadly applied to other types of hydrogels with tunable mechanics, through either covalent or physical crosslinking, to enable precise control over stem cell differentiation. Moreover, these microgels containing cells can be used as versatile bio-inks for various 3D printing applications, as well as building blocks for annealed particle hydrogels and granular hydrogels for regenerative medicine. Collectively, these data and results demonstrate that the encapsulated hMSCs within the NorHA microgel retain high viability and preserve their robust differentiation potential, which could pave the way for a variety of applications from fundamental stem cell biology research to developing therapeutic cell-based therapy.

These results demonstrate a single-cell encapsulation method based on immersed AC electrospray that is compatible with traditional crosslinking strategies for both natural and synthetic hydrogels. Using the "tip streaming" mode, cells are ejected as they block the streaming flow of the alginate, collagen, or NorHA precursor solution resulting in a hydrogel droplet with a single cell. An alternating frequency higher than the charge relaxation frequency of the precursor solution is shown to be able to generate slender cones that help avoid cell aggregation within the conic meniscus. After crosslinking, the smaller empty particles can be separated from the single-cell particles using moderate extraction conditions resulting in predominant single cell particles in cell media (>80%). The final gel layer around the cell has a typical thickness of around four microns, allowing fast nutrient transport and better cell survival. Because electrospray behavior exists in many solution types, such a technology can be applicable to other cell types and hydrogel systems, such as photo-crosslinked [13] and dynamic hydrogels [14]. Since the microgel fabrication technique can influence the properties of granular hydrogels, this high-throughput single-cell encapsulation technique can be used to generate microgels with tunable properties as building blocks for granular hydrogels. Therefore, this unique technology has the potential to make high impact contribution in a range of applications in cell therapy, pharmacokinetic screening, and regenerative medicine.

Example 12

Formation of Synthetic Hydrogels and Guest-Host Interactions

Figure 8A:
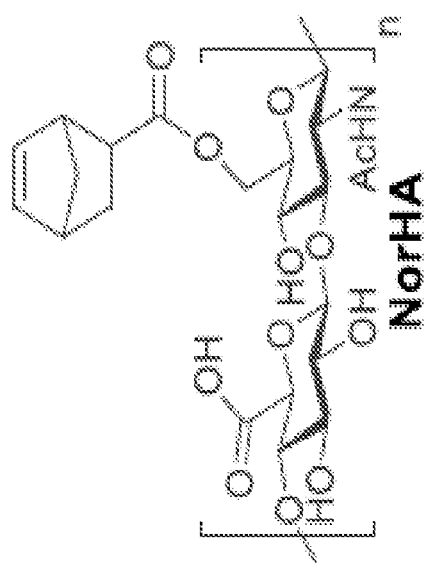
FIG. 8A shows a representative image of a single unit of norbornene-functionalized hyaluronic acid (NorHA) used as a synthetic hydrogel polymer.
Figure 8B:
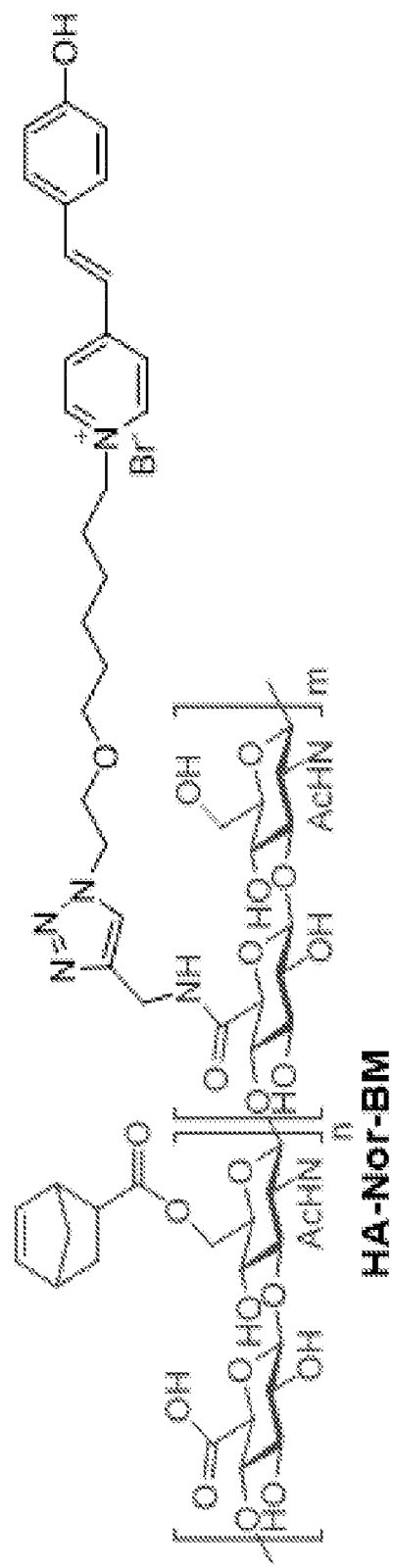
FIG. 8B shows a representative image of NorHA further functionalized with the organic dye, Brooker's Merocyanine (HA-Nor-BM) used as a synthetic hydrogel polymer.
Figure 8C:
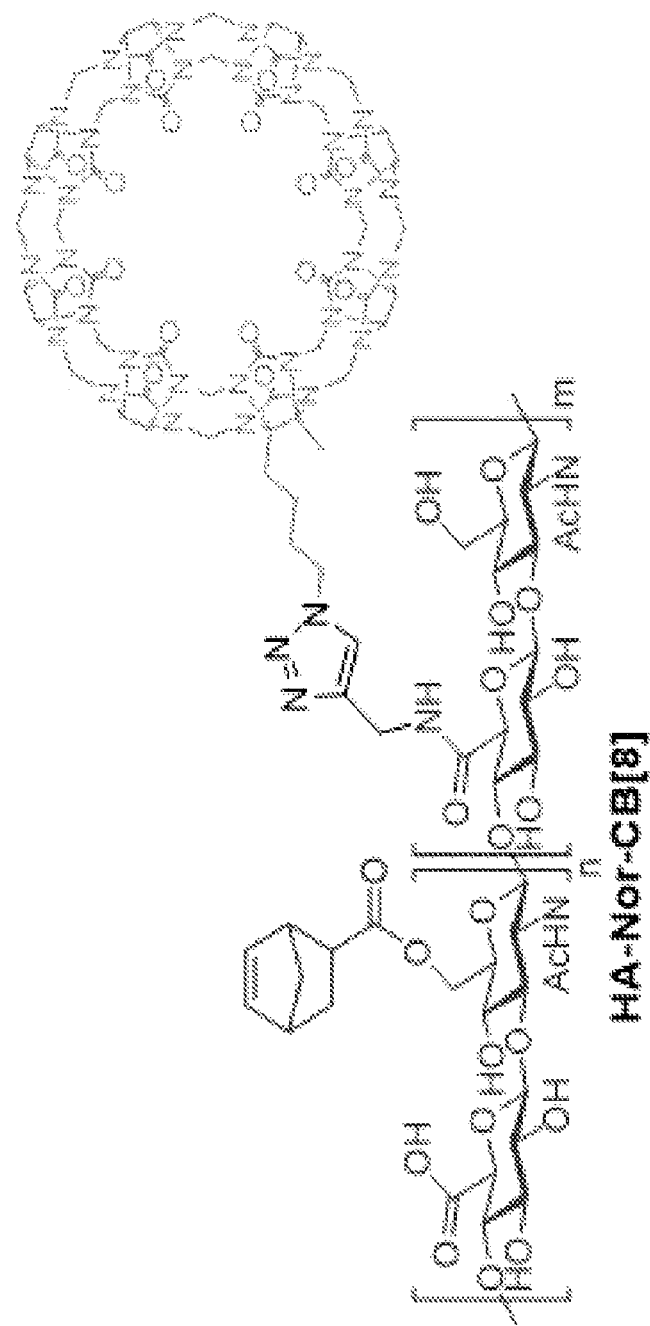
FIG. 8C shows a representative image of NorHA further functionalized with cucurbit[B]uril (HA-Nor-CB[8]) used as a synthetic hydrogel polymer.
Figure 8D:
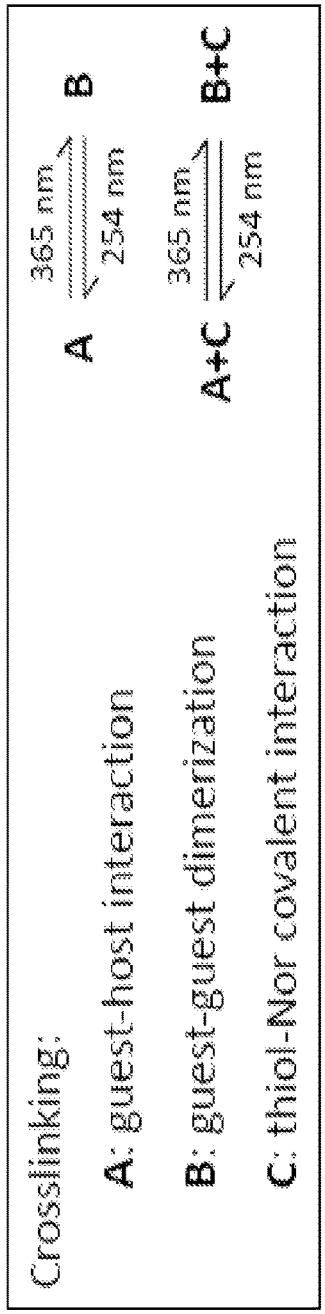
FIG. 8D shows the different synthetic hydrogel crosslinking conditions that were tested.
Figure 8E:
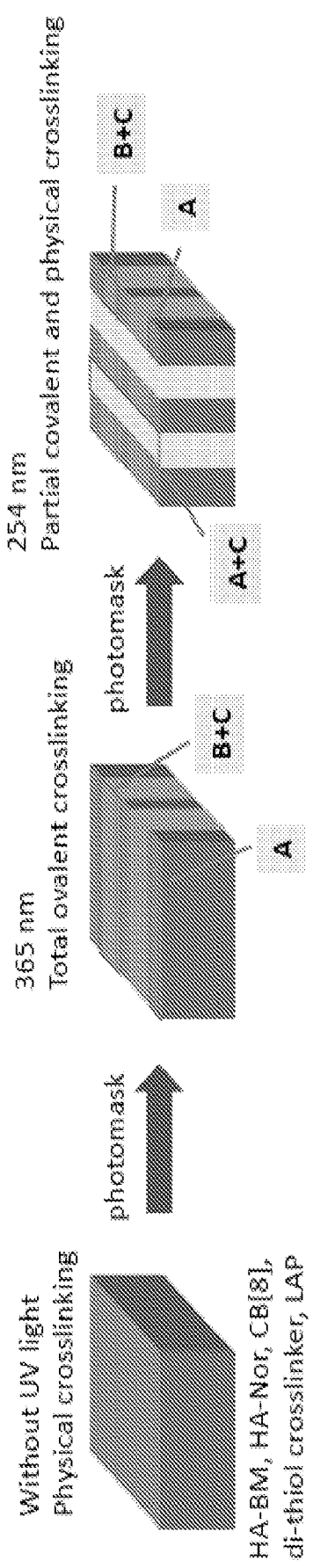
FIG. 8E-G show schematics illustrating the synthetic hydrogel crosslinking characteristics that result under different UV light and reagent conditions.
Figure 8F:
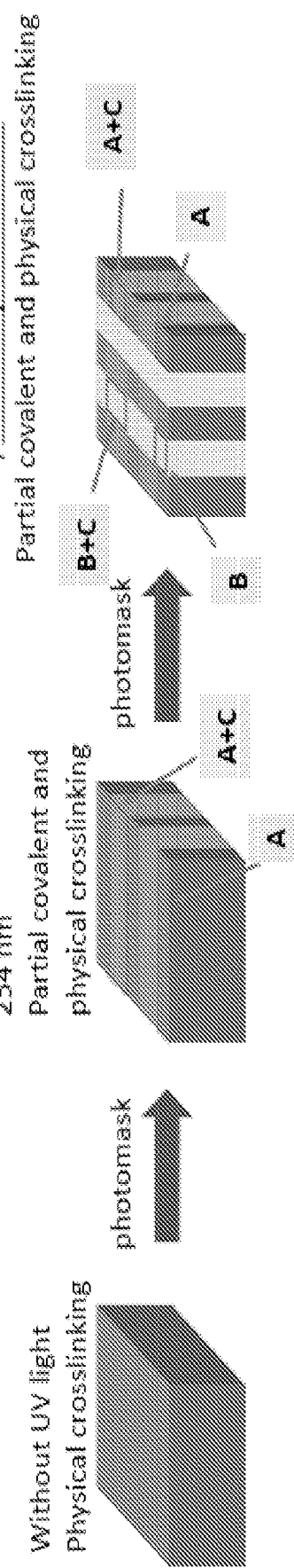
Figure 8G:
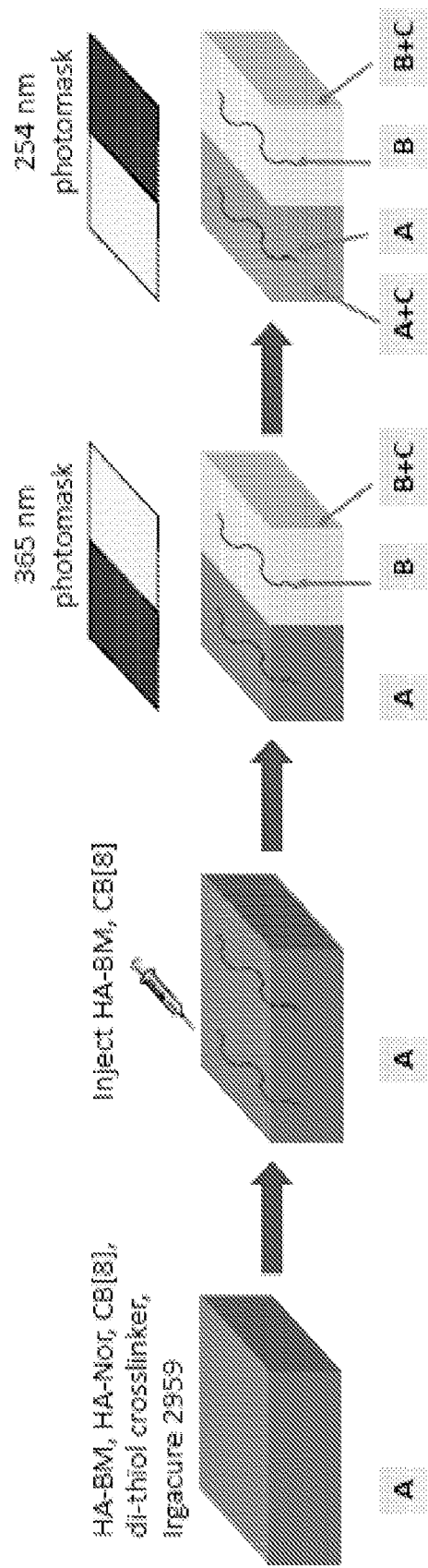

To generate the synthetic hydrogel for cell encapsulation, functionalization of hyaluronic acid (HA) was initially tested with various molecular groups, reagents, and cross-linking conditions. Multiple synthetic HA polymers were generated including NorHA (FIG. 8A), HA-Nor-BM (FIG. 8B), and HA-Nor-CB[8] (FIG. 8C). A "guest" molecule comprising the organic dye, Brooker's Merocyanine (BM), or norbornene (Nor) were modified on HA separately with a "host" molecule, cucurbit[B]uril (CB[8]), using a di-thiol crosslinker (DTT), a radical inhibitor (TEMPO), and a photoinitiator comprising either Irgacure 2959 (12959) or lithium phenyl-2,4,6-trimethylbenzoylphosphinate (LAP). Alternatively, BM and Nor were modified on the same HA.

Different synthetic hydrogel crosslinking conditions were tested, as illustrated in FIGS. 8D-G. These reactions resulted in the following crosslinking characteristics: (1) Without UV light: guest-host interaction only, physical crosslinking; (2) Without photoinitiator or adding radical inhibitor: 365 nm UV light, guest-guest dimerization only, partial chemical/covalent crosslinking; 254 nm UV light, reversal of dimerization only, physical crosslinking; and (3) With photoinitiator: 365 nm UV light, guest-guest dimerization and thiol-Nor reaction, total chemical crosslinking; 254 nm UV light, reversal of dimerization and thiol-Nor reaction, physical crosslinking and partial chemical crosslinking.

Additionally, HA-BM/CB[8] hydrogel formation was tested by mixing HA-BM (guest) with CB[8] in low concentration HA-BM, freeze drying, and then reconstituting in high concentration HA-BM. HA-BM mixed with DTT in the absence of UV light resulted in no gelation, indicating that HA-guest cannot react with the DTT thiol without UV irradiation. When HA-BM was mixed with CB[8] at increasing HA-BM concentrations from 10 mg/mL to 40 mg/mL, gelation only occurred at 40 mg/mL HA-BM while the mixture was still a solution at 10 mg/ml and 20 mg/mL, and at 30 mg/mL the resulting hydrogel was soft and would flow downward in only a few minutes. At the higher concentration of 40 mg/mL HA-BM, the resulting hydrogel was stiffer and did not exhibit the same rapid downward flow. When 20 mg/mL HA-guest was mixed with CB[8] and UV irradiated from 320-390 nm at 35 mW/cm$^2$ for 15 min, small pieces of hydrogel dispersed in solution were observed. Additionally, mixing 40 mg/ml HA-guest with CB[8], then adding DTT/12959 and UV irradiating from 320-390 nm at 35 mW/cm$^2$ for 5 min led to a significant change in the stiffness of the hydrogel. Further incubation of the gel with PBS to wash out the DTT/I2959 followed by additional UV irradiation at 254 nm for about 40 minutes generated a slightly softer gel. It was found that the guest dimerization can be partially reversed under 254 nm UV, and the DTT could not react with the guest with UV. Lastly, mixing HA-guest (40 mg/ml), CB[8], DTT, NorHA (10 mg/mL), and photoinitiator generates a soft gel. However, following UV irradiation of the gel from 320-390 nm at 35 mW/cm$^2$ for 5 min produces a stiffer gel. The optimal crosslinking conditions for the hydrogel NorHA using the photoinitiator LAP and di-thiol cross-linker DTT were found to be UV irradiation (10 mW cm$^{-2}$, 365 nm) for at least about 5 seconds.

What is claimed:

1. A method for high-throughput single-cell encapsulation and tip streaming, the method comprising:
   (a) combining a plurality of cells with a hydrogel and oil to generate a water-in-oil emulsion;
   (b) agitating the emulsion to drive single cells into the center of individual hydrogel beads to generate single-cell encapsulated hydrogel beads;
   (c) crosslinking the hydrogel;
   (d) extracting the crosslinked single-cell encapsulated hydrogel beads from the emulsion into cell media;
   (e) transferring the extracted single-cell encapsulated hydrogel beads into a micropipette;
   (f) applying a back pressure and alternating current (AC) electric potential to the micropipette to generate an AC Taylor cone encompassing a droplet containing the single-cell encapsulated hydrogel bead at the micropipette tip; and (g) ejecting the droplet containing the single-cell encapsulated hydrogel bead from the micropipette tip.

2. The method of claim 1, wherein the plurality of cells comprises human cancer cells or human multipotent mesenchymal stromal cells (hMSCs).

3. The method of claim 1, wherein agitating comprises the use of a shaker at about 500-5000 rpm for at least about 1 minute, and wherein agitating does not affect droplet monodispersity.

4. The method of claim 1, wherein the hydrogel comprises a natural hydrogel comprising alginate or collagen, or wherein the hydrogel comprises a synthetic hydrogel comprising hyaluronic acid functionalized with norbornene groups (NorHA).

5. The method of claim 4, wherein the alginate is present at about 2 wt %.

6. The method of claim 4, wherein the alginate encapsulated hydrogel beads have an average thickness of about 4-5 µm, or wherein the collagen encapsulated hydrogel beads have an average thickness of about 4-6 µm.

7. The method of claim 4, wherein the alginate encapsulated hydrogel beads have a cell viability of about 80-85% after 24 hours in vitro, or wherein the collagen encapsulated hydrogel beads have a cell viability of about 70-75% after 24 hours in vitro.

8. The method of claim 4, wherein the crosslinking of alginate comprises mixing alginate with a complex of divalent cations, ethylenediaminetetraacetic acid (EDTA), and 0.01% acetic acid for about 2 minutes, or wherein the crosslinking of collagen comprises increasing the temperature of the collagen to 37° C. at a neutral pH for about 30 minutes.

9. The method of claim 4, wherein extracting the single-cell encapsulated alginate beads into cell media comprises mixing the emulsion with 10% w/w 1H,1H,2H,2H-perfluorooctanol (PFO) followed by centrifugation at about 100-500×g for at least about 2 minutes, or wherein extracting the single-cell encapsulated collagen beads into cell media comprises mixing the emulsion with 10% w/w 1H,1H,2H, 2H-perfluorooctanol (PFO) followed by centrifugation at about 100-500×g for at least about 2 minutes.

10. The method of claim 4, wherein the NorHA hydrogel is prepared by mixing 1.2% w/v NorHA macromer with dithiothreitol (DTT) at a 0.8 ratio in PBS and adding 0.2% w/v of the water soluble photoinitiator lithium phenyl-2,4, 6-trimethylbenzoylphosphinate (LAP).

11. The method of claim 4, wherein the NorHA encapsulated hydrogel beads have an average thickness of about 2-3 µm.

12. The method of claim 4, wherein the NorHA encapsulated hydrogel beads have a cell viability of greater than 80% after 24 hours in vitro.

13. The method of claim 4, wherein the crosslinking of NorHA comprises irradiating the NorHA with UV light (10 mW cm$^{-2}$, 365 nm) for at least about 5 seconds, and wherein extracting the single-cell encapsulated NorHA beads into cell media comprises mixing the emulsion with 25% w/w 1H,1H,2H,2H-perfluorodecanol (PFD) followed by centrifugation at about 100-500×g for at least about 2 minutes.

14. The method of claim 4, wherein the NorHA hydrogel preserves the osteogenic and adipogenic differentiation potential of hMSCs.

15. The method of claim 1, wherein the droplet encompassed by the AC Taylor cone and containing the single-cell encapsulated hydrogel bead is electroneutral, and wherein the AC Taylor cone has a half angle less than 49°.

16. The method of claim 1, wherein the micropipette tip has a diameter of about 30 µm, and wherein the droplet has a diameter size range of about 1 µm to about 10 µm.

17. The method of claim 1, wherein the AC electric potential comprises a frequency greater than the inverse charge relaxation time of the micropipette tip orifice.

18. The method of claim 1, wherein the AC electric potential comprises a frequency of about 10 KHz to about 300 KHz and a voltage of about 300 V to about 500 V, and wherein the back pressure is set slightly below a critical pressure of 2.4 kPa.

19. The method of claim 1, wherein the tip streaming has a flow rate of about 5 nL/min.

20. The method of claim 1, wherein the method generates an encapsulation efficiency greater than 80%, and wherein greater than 85% of the single-cell encapsulated hydrogel beads have a concentric index (CI) below 0.8, indicating that most encapsulated single cells are centered within the hydrogel bead droplet.

* * * * *